US008955103B2

(12) United States Patent
Kline, III et al.

(10) Patent No.: US 8,955,103 B2
(45) Date of Patent: Feb. 10, 2015

(54) SYSTEM AND METHOD FOR DECENTRALIZED ONLINE DATA TRANSFER AND SYNCHRONIZATION

(71) Applicant: Adept Cloud, Inc., San Mateo, CA (US)

(72) Inventors: Frank-Robert Kline, III, Palo Alto, CA (US); Aaron Moise Nathan, Palo Alto, CA (US); Jonathan R. Schoenberg, Fishers, IN (US)

(73) Assignee: Hightail, Inc., Campbell, CA (US)

( * ) Notice: Subject to any disclaimer, the term of this patent is extended or adjusted under 35 U.S.C. 154(b) by 0 days.

(21) Appl. No.: 13/734,843

(22) Filed: Jan. 4, 2013

(65) Prior Publication Data

US 2013/0179947 A1 Jul. 11, 2013

Related U.S. Application Data

(60) Provisional application No. 61/583,340, filed on Jan. 5, 2012, provisional application No. 61/720,973, filed on Oct. 31, 2012.

(51) Int. Cl.
*H04L 12/66* (2006.01)
*H04L 29/06* (2006.01)
*H04L 29/08* (2006.01)
*H04L 12/12* (2006.01)

(52) U.S. Cl.
CPC ............ *H04L 63/10* (2013.01); *H04L 63/0823* (2013.01); *H04L 63/0884* (2013.01); *H04L 63/0892* (2013.01); *H04L 67/28* (2013.01)
USPC .............................................. 726/21; 726/28

(58) Field of Classification Search
CPC combination set(s) only.
See application file for complete search history.

(56) References Cited

U.S. PATENT DOCUMENTS

| 6,996,841 | B2* | 2/2006 | Kadyk et al. ................. 726/12 |
| 8,103,876 | B2* | 1/2012 | Little et al. .................. 713/175 |
| 2003/0093666 | A1* | 5/2003 | Millen et al. ................ 713/157 |
| 2004/0054779 | A1* | 3/2004 | Takeshima et al. .......... 709/225 |
| 2011/0231652 | A1 | 9/2011 | Bollay et al. |

FOREIGN PATENT DOCUMENTS

| EP | 2043073 A1 | 4/2009 |
| WO | WO-2013/103897 A1 | 7/2013 |

OTHER PUBLICATIONS

"International Application Serial No. PCT/US2013/020393, International Search Report mailed May 13, 2013", 3 pgs.
"International Application Serial No. PCTIUS2013/020393, Written Opinion mailed May 13, 2013", 4 pgs.

* cited by examiner

*Primary Examiner* — Venkat Perungavoor
(74) *Attorney, Agent, or Firm* — Fenwick & West LLP

(57) ABSTRACT

A method of sharing data is disclosed. A request from a client node to access data in a share associated with a server node is received. A communication from a management nexus is received. The communication includes a confirmation of an identity of the client node and a confirmation of an authorization for the client node to access the data in the share associated with the server node. The client node is allowed to access the data in the share associated with the server node based on the communication from the management nexus. However, the data is not sent to the management nexus.

14 Claims, 21 Drawing Sheets

1100

All Clouds > My Cloud (Frank Kline - frank.kline@gmail.com)

| Name | Date Modified | Type | Size |
|---|---|---|---|
| Adept Cloud | 07/18/2012 6:58 PM | Folder | |
| Californium Emulator | 08/09/2012 7:21 PM | Folder | |
| Nexus 4B S | 07/31/2012 4:41 PM | Folder | |
| Packages | 08/01/2012 1:13 PM | Folder | |
| Reading | 07/12/2012 8:45 PM | Folder | |
| Receipts | 07/27/2012 12:06 AM | Folder | |
| Wedding | 08/07/2012 9:15 PM | Folder | |
| Scratch.txt | 08/08/2012 2:52 PM | File | 177 Bytes |
| desktop.ini | 06/30/2012 8:33 PM | File | 313 Bytes |

| adeptCloud | | | | | logged in as Frank Kline | logout |
|---|---|---|---|---|---|---|
| Clouds | Organizations | Contacts | Accounts | Install | | |
| Clouds | Invitations | (+) Add Cloud | | Help | | |

Clouds

Clouds are folders you can sync on your computer and share with others

[Feedback]

| | Name | My Role | Kind | Onsite Backup | Web Access |
|---|---|---|---|---|---|
| ☁ | My Cloud | Administrator | Private | Yes | No |
| ☁ | Aaron-Frank Share | Administrator | Shared | Yes | No |
| ☁ | Adept | Administrator | Shared | Yes | No |
| ☁ | Adept Artwork | Can Edit + Invite Others | Shared | Yes | No |

600

*FIG. 6* adeptCloud

| Clouds | Organizations | Contacts | Accounts | Install |

Computers  ⚙ Options  🛒 Billing logged in as Frank Kline | logout

Help    Feedback

Computers and Devices
Computers and devices registered with your account

| Name | Type | Status | Last Online | Actions | |
|---|---|---|---|---|---|
| Californium | Windows (32-bit) | Online | Now | Rename | Unlink |
| Frank-Robert's iPad | iOS (32-bit) | Offline | 5:23 PM, 07/06/2012 | Rename | Unlink |
| FRANKR-TABLET | Windows (64-bit) | Offline | 4:34 PM, 06/28/2012 | Rename | Unlink |
| Mac Mini | Mac (64-bit) | Offline | 5:24 PM, 08/11/2012 | Rename | Unlink |

*FIG. 7*

User Management

Manage Users who have access to Frank Test Organization

<< First <Previous   1 - 2 of 2   Next > Last >>

| | Name | Email | Status | Managed |
|---|---|---|---|---|
| | Frank Kline | frank.kline@gmail.com | Enabled | No |
| | Frank-Robert Kline | frank@adeptcloud.com | Enabled | No |

<< First <Previous   1 - 2 of 2   Next > Last >>

Create Managed User

Onsite Services

Manage advanced behind-the-firewall services for Frank Test Organization

| Server Name | Services | Version | Status | Last Online |
|---|---|---|---|---|
| MacMini Onsite | Storage | 0.2.2.0.3632 | Offline | 10:03 PM, 08/10/2012 |

Add Services   Downloads

*FIG. 9*

| Nexus Session Id | Nexus Session Token | Comp Id | User Id | User ACL Revision | Time Created | Time Ended |
|---|---|---|---|---|---|---|
| Monotonically incrementing id with which to refer to each session. We want to tie the node-node sessions to these identifiers. Plus, we want a non-secure identifier with which to refer to the session if displayed in the ui. | Base64 encoded random UUID that the nodes used to authenticate requests with the nexus | Id of the computer this session is tied to | Id of the user this session is tied to | A revision number representing the user's participated ACL state. Any changes the user's ACLs participation of the ACLs themselves causes this number to increment by some value. | Time this session was created | If NULL, session is still open, if not null, then session has been closed |

| Nexus Session Id | Nexus Session Token | From Id | To Id | From Nexus Session Id | To Nexus Session Id | Time Created | Time Ended |
|---|---|---|---|---|---|---|---|
| Monotonically incrementing id with which to refer to each session. We want a non-secure identifier with which to refer to the session if displayed in the ui. | Base64 encoded random UUID that the nodes used to authenticate requests with the nexus | Id of the computer representing the requesting computer | Id of the computer representing the requesting computer | Id of the nexus session from the computer that was under when this session was created | Id of the nexus session to the computer that was under when this session was created | Time this session was created | If NULL, session is still open, if not null, then session has been closed |

―――――― PLAINTEXT HEADER ――――――

2 bytes - Protocol Version Byte (currently 0x0001)
8 bytes - Crypto Set ID (identified the keys to the nexus)
8 bytes - Ciphertext Length
16 bytes - AES Random IV
20 bytes - Header SHA1-HMAC

―――――― ENCRYPTED MESSAGE ――――――

2 bytes - Endpoint Name Length (N)
N bytes - UTF8 String of the endpoint name
2 bytes - JSON Metadata Length (M)
M bytes - UTF8 String of JSON metadata
K bytes - Message Data

―――――― PLAINTEXT FOOTER ――――――

20 bytes - Full Message SHA1-HMAC including plaintext header

*FIG. 14*

| <revision> | <filename> | <directory?> | <deleted?> | <adler32> | <size> | <file timestamp> | <backup timestamp> | <version clock> | <data loc> |

| Action | Logged Visibility Context* | Information (preliminary) |
|---|---|---|
| User Create/Delete | USER_ID, ORG_ID | User Info |
| User Detail Edit | USER_ID, ORG_ID | User Info Delta |
| User Computer Register/Unlink | USER_ID, ORG_ID | User Id, Computer Name, IP Type |
| User Download Client | USER_ID, ORG_ID | User Id, Client Type |
| User Login to Web UI | USER_ID, ORG_ID | User Id, Remote Agent IP & Info |
| User Login/Logoff to Application | USER_ID, ORG_ID | User Id, Remote Agent IP, Type of Application |
| User Login Failure | USER_ID, ORG_ID | User Id, Remote Agent IP, Type of Application |
| Organization User Added/Removed | USER_ID, ORG_ID | User Id, Org Id, Action |
| Organization Option Modifier | USER_ID, ORG_ID | User Id, Org Id, Org Name Option |
| Organization Server Status Change | ORG_ID | Org Id, Server Daemon Id, Server Up/Down |
| Organization Server Added/Removed | ORG_ID | Org Id, Server Daemon Id, State name, Subscription Cost |
| Organization Plan Changed | ORG_ID | Org Id, New Plan Id |
| Cloud Created/Deleted | CLOUD_ID, ORG_ID, USER_ID (cloud admins) | Cloud Id, Name, Initial Members |
| Cloud Invitation Sent/Accepted | CLOUD_ID, ORG_ID, USER_ID (cloud admins), USER_ID (cloud inv sender), USER_ID (cloud inv receiver) | Cloud Id, Sender User Id, Receiver User Id, inv Status |
| Cloud User Permission Change | CLOUD_ID, ORG_ID, USER_ID (cloud admins), USER_ID (cloud inv sender), USER_ID (cloud inv receiver) | Cloud Id, User Id, Permission Set Delta |
| Cloud Option Modified | CLOUD_ID, ORG_ID, USER_ID (cloud admins) | Cloud Id, Cloud Name, Cloud Def Name, Sync Status, Storage Agent Status |

| Action | Logged Visibility Context* | Information (preliminary) |
|---|---|---|
| File/Folder Create, Edit, Delete | CLOUD_ID, ORG_ID, USER_ID | Storage RFS Id (gives full revision entry for resolving comp ids) |
| Cloud Created/Deleted | CLOUD_ID, ORG_ID, USER_ID (cloud admins) | Cloud Id, Name, Initial Members |
| Cloud Invitation Sent/Accepted | CLOUD_ID, ORG_ID, USER_ID (cloud admins), USER_ID (cloud inv sender), USER_ID (cloud inv receiver) | Cloud Id, Sender User Id, Receiver User Id, inv Status |
| Cloud User Permission Change | CLOUD_ID, ORG_ID, USER_ID (cloud admins), USER_ID (cloud inv sender), USER_ID (cloud inv receiver) | Cloud Id, User Id, Permission Set Delta |
| Cloud Option Modified | CLOUD_ID, ORG_ID, USER_ID (cloud admins) | Cloud Id, Cloud name, Cloud Def Name, Sync Status, Storage Agent Status |

*FIG. 18*

| index_id | computer_id | version_clock |
|---|---|---|
| maps to the "id" column in the adpet_index table | Computer ID that has the file and the corresponding cloud mounted | Version clock of the file on the corresponding computer |

SYSTEM AND METHOD FOR DECENTRALIZED ONLINE DATA TRANSFER AND SYNCHRONIZATION

CROSS-REFERENCE TO RELATED APPLICATIONS

This application claims the benefit of U.S. Provisional Application No. 61/583,340, filed Jan. 5, 2012, entitled "SYSTEM AND METHOD FOR DECENTRALIZED ONLINE DATA TRANSFER AND SYNCHRONIZATION," and U.S. Provisional Application No. 61/720,973, filed Oct. 31, 2012, entitled "PRIVATE DATA COLLABORATION SYSTEM WITH CENTRAL MANAGEMENT NEXUS," each of which is incorporated herein by reference in its entirety.

TECHNICAL FIELD

This application relates generally to the technical field of sharing files, and, in one specific example, to allowing organizations to implement internal and external data collaboration without violating the security policies of the organization.

BACKGROUND

Employees of an organization often need to share access to files, whether they are working locally (e.g., inside a firewall of the organization) or remotely (e.g., outside the firewall). Additionally, employees of the organization may need to share access to such files, which may otherwise be intended to remain private to the organization, outside the organization (e.g., with employees of other organizations). With existing data collaboration tools, it may be difficult for an organization to control such file sharing such that security policies of the organization are not compromised.

BRIEF DESCRIPTION OF THE DRAWINGS

Some embodiments are illustrated by way of example and not limitation in the figures of the accompanying drawings in which:

FIG. 4 is a screenshot depicting an example embodiment for allowing a user to view files in my cloud using Onsite;

FIG. 6 is a screenshot depicting an example embodiment of a user interface for central management of the storage system;

FIG. 7 is a screenshot depicting an example embodiment of a user interface for managing computers and devices centrally;

FIG. 9 is a screenshot depicting an example embodiment of a user interface for managing users and onsite services centrally;

FIG. 12 is a table illustrating examples of data items that each nexus session may persistently keep track of;

FIG. 13 is a table depicting examples of data items that each node session may keep track of;

FIG. 14 is a description of an example embodiment of what message construction may look like;

FIG. 15 is a table illustrating an example embodiment of a database table for an example candidate implementation of a revisioning file storage service;

FIG. 17 is a table illustrating an example embodiment of nexus logging particulars for three classes: user, organization, and cloud;

FIG. 18 is a table illustrating an example embodiment of cloud-level logging particulars;

DETAILED DESCRIPTION

Figure 1:
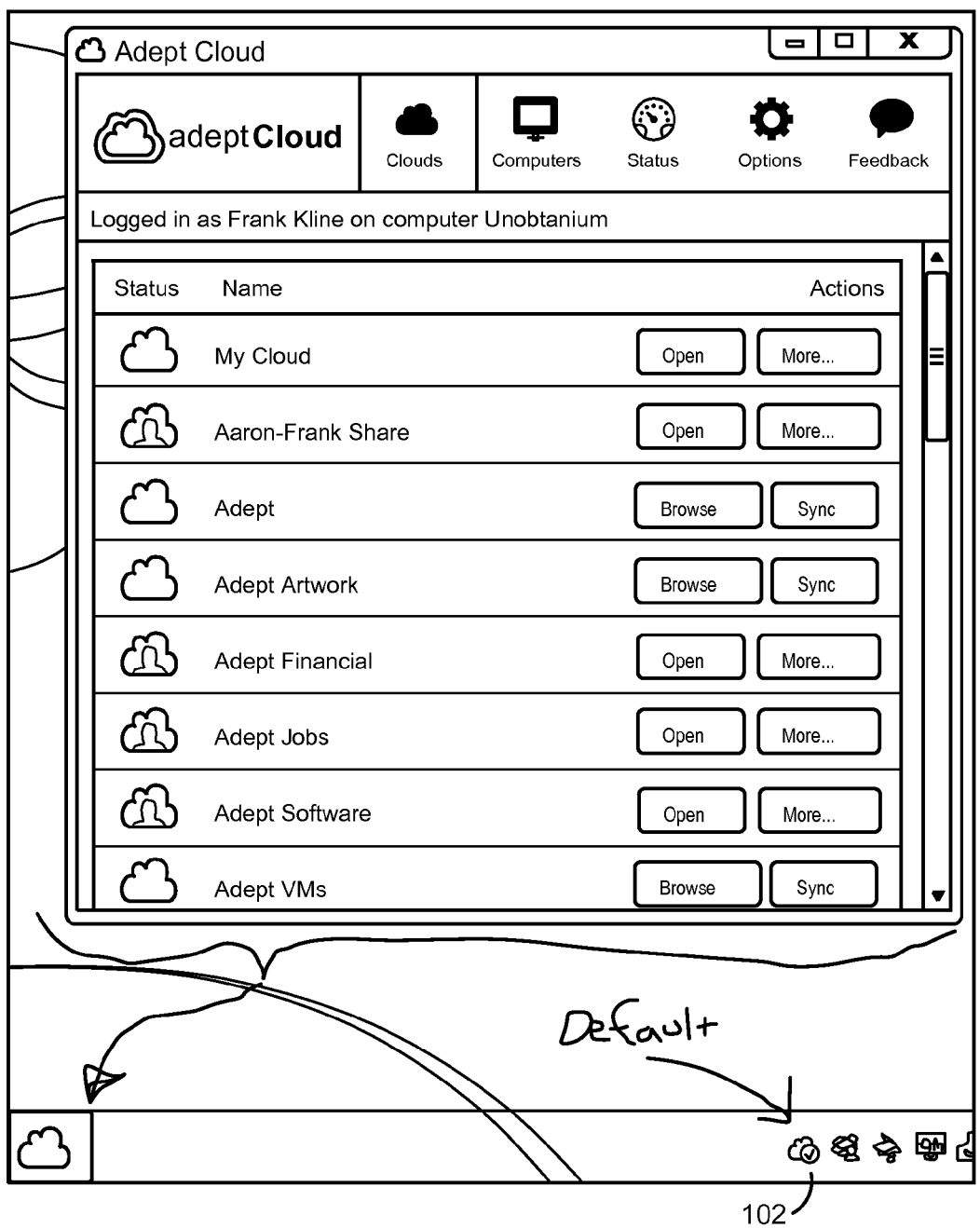
FIG. 1 is a screenshot depicting an example embodiment of a user interface of a desktop client.

In the following description, for purposes of explanation, numerous specific details are set forth in order to provide an understanding of various embodiments of the present subject matter. It will be evident, however, to those skilled in the art that various embodiments may be practiced without these specific details.

In various embodiments, methods for sharing data are disclosed. A request from a client node to access data in a share associated with a server node is received. A communication from a management nexus is received. The communication includes a confirmation of an identity of the client node and a confirmation of an authorization for the client node to access the data in the share associated with the server node. The client node is allowed to access the data in the share associated with the server node based on the communication from the management nexus. However, the data is not sent to the management nexus.

This method and other methods disclosed herein may be implemented as a computer system having one or more modules (e.g., hardware modules or software modules). This method and other methods disclosed herein may be embodied as instructions stored on a machine-readable medium that, when executed by a processor, cause the processor to perform the method.

Existing cloud-based collaboration systems may store data of a business at their internet datacenters, which may result in a loss of privacy, loss of security, or regulatory concerns for the business. Methods and systems described herein may offer a better way for businesses with sensitive data to collaborate internally and externally. In various embodiments, methods include providing a private, unlimited solution that is simple to use, easy to manage, and low in complexity and cost. In various embodiments, methods include providing systems that are purpose-built for sensitive files. In various embodiments, data of a business is stored on private nodes, but not on servers external from the private nodes.

Existing cloud-based collaboration solutions may charge business for storing data at their internet datacenters, penalizing data generation. In various embodiments, the methods and systems described herein do not include such charges for cloud storage space. In various embodiments, such methods include enabling colleagues in business to synchronize and share unlimited files of unlimited size.

Existing private collaboration and storage solutions may come with significant complexity and maintenance burdens for a business, based on, for example, the sole responsibility of the business to deploy, manage, monitor, and upgrade a complex storage system. In various embodiments, unique technology enables configuration, administration, and management of a storage solution at a central location, but does not access or have information about business files or data. In various embodiments, methods enable deployment of a storage solution within minutes that takes care of the system complexities.

Existing private collaboration solutions may emphasize data privacy at the cost of usability and access. In various embodiments, methods and system described herein focus on ease and accessibility. In various embodiments, such methods include an installation procedure that takes just a few clicks within an operating system, such as Windows, Mac, and Linux. In various embodiments, mobile applications (e.g., iOS, Android, Kindle Fire, and Blackberry apps) provide on-the-go access. In various embodiments, a secure gateway is used to provide access to files from outside a business enclave or to collaborate with other businesses while enabling the business to keep complete control over its network.

In various embodiments, Onsite technology enables an administrator to efficiently and effortlessly track, view, and restore files from any moment in time. In various embodiments, the Onsite technology is privately located, yet managed and monitored centrally (e.g., from a public domain such as adeptcloud.com).

In various embodiments, a method enables users to collaborate on files in various workflows, such as the workflows described below.

Synchronization. Users may actively synchronize files and folders on their computers by mounting Clouds using the client desktop software. Changes a user makes to files/folders within a mounted Cloud will be immediately synchronized in the background to other computers who have the Cloud mounted (as well as backed up to Onsite).

Browse/Download/Upload (Cloud Browser). Enables collaboration with large repositories (e.g., repositories having too much data to synchronize to a local computer), and solving other use cases as well. The Cloud Browser enables access and modification of files/folders in Clouds not mounted to the desktop. Importantly, this enables virtualizing/synthesizing of multiple disparate file repositories into an easy Windows-Explorer-like view.

Web-based Access (via Onsite). Importantly, as data may not be stored externally from private nodes (e.g., in a central repository), web-based access may not be provided at a public domain (e.g., adeptcloud.com). Thus, Onsite may provide web-based access to files and repositories.

Mobile (e.g., iOS, Android, Blackberry, Kindle Fire). Similar to the Cloud Browser, mobile clients may operate by providing browse/download/upload into/from existing Clouds.

FIG. 1 is a screenshot depicting an example embodiment of a user interface 100 of a desktop client. Once installed, the desktop client may run in the background on user computers. The desktop client user interface 100 may show status via a System Tray icon 102 and may be opened/interacted with via the System Tray icon.

Figure 2:
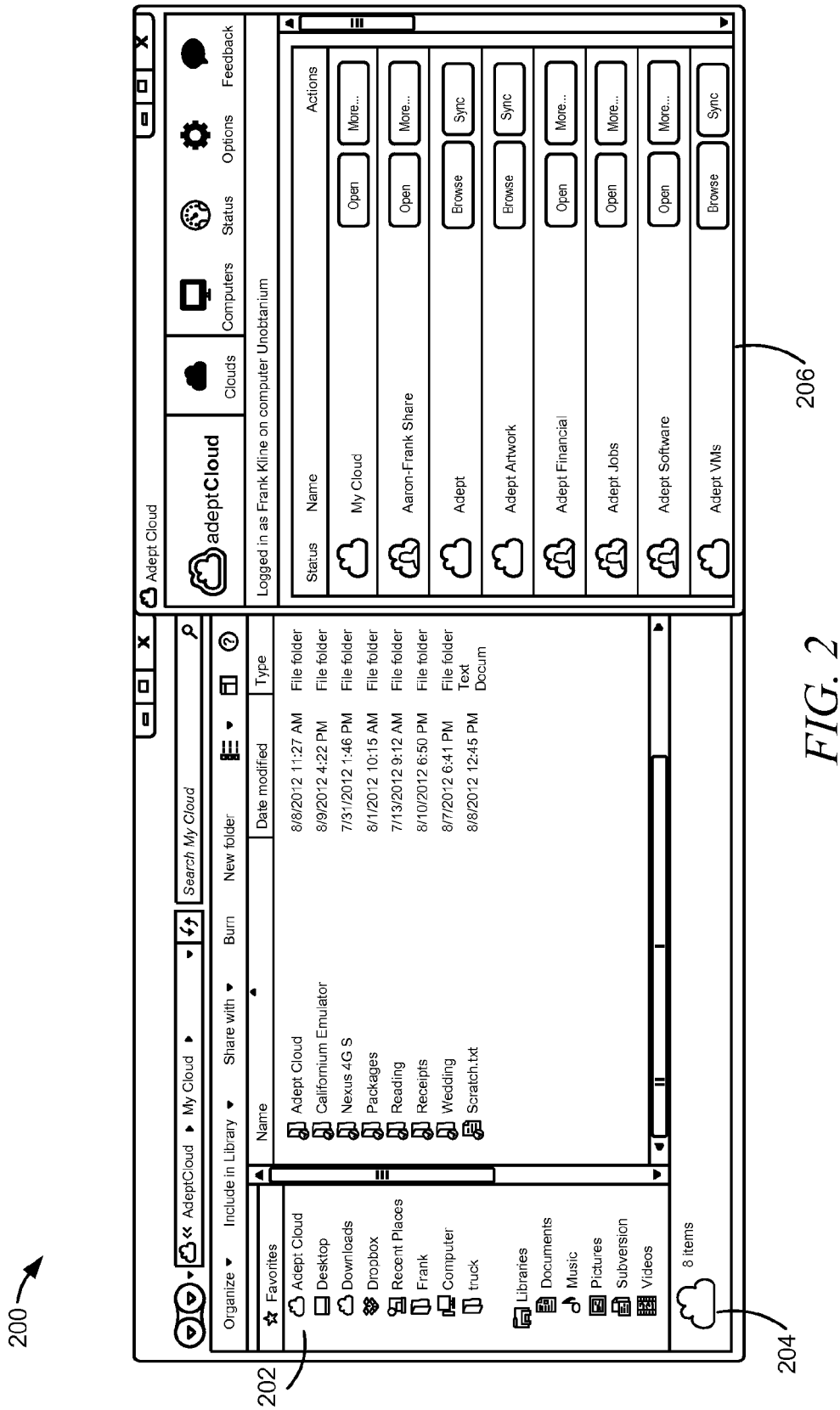
FIG. 2 is a screenshot depicting an example embodiment of a user interface in which a cloud (e.g., "my cloud") has been mounted on a users computer.

FIG. 2 is a screenshot depicting an example embodiment of a user interface 200 in which a Cloud (e.g., "my cloud") has been mounted on the user's computer. In various embodiments, a file icon 202 is overlaid on a folder or file corresponding to the Cloud in an application of an operating system (e.g., Windows Explorer of Microsoft Windows) or a Cloud icon 204 is displayed in a toolbar of the application. In various embodiments, the desktop client 206 shows "my cloud" is mounted.

Figure 3:
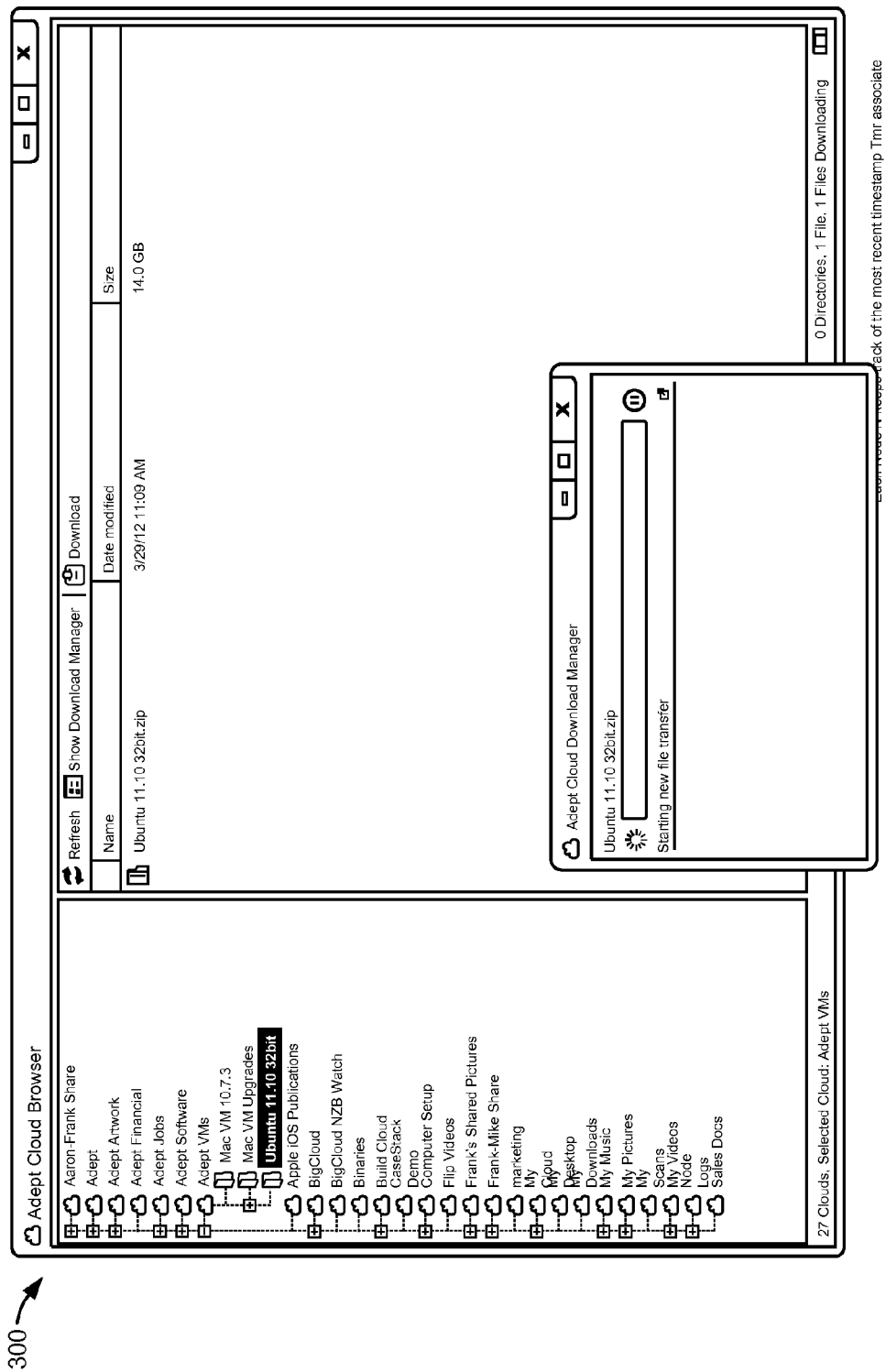
FIG. 3 is a screenshot depicting an example embodiment of a user interface of a Cloud Browser.

FIG. 3 is a screenshot depicting an example embodiment of a user interface 300 of the Cloud Browser. In various embodiments, the Cloud Browser enables exploration and collaboration with respect to large repositories. In various embodiments, the Cloud Browser may be opened via the desktop client.

FIG. 4 is a screenshot depicting an example embodiment of a user interface 400 presented in a web browser with web access to enable a user to view files in my cloud using Onsite.

Figure 5:
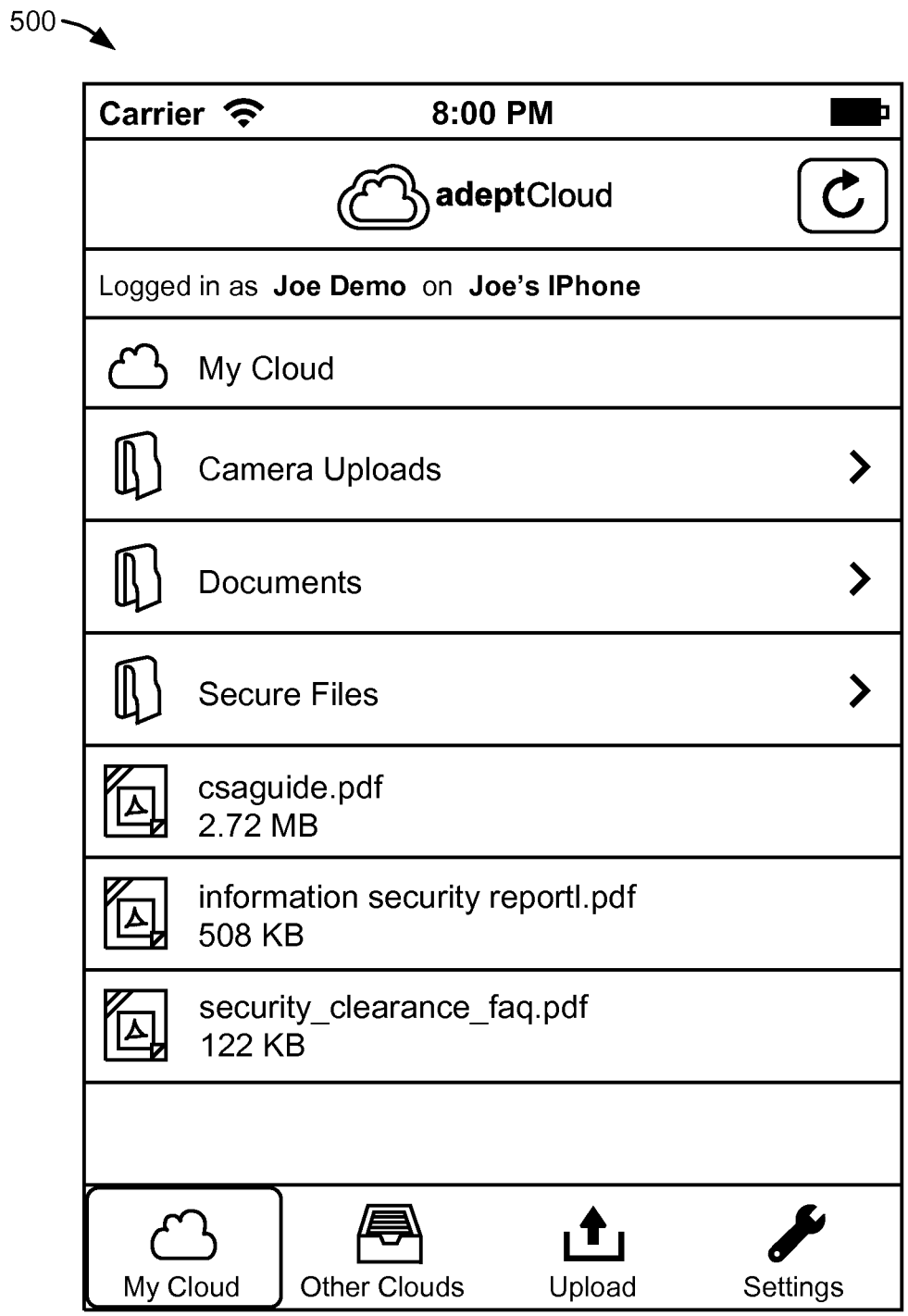
FIG. 5 is a screenshot depicting an example embodiment of a user interface presented in a mobile device to allow a user to view files in my cloud.

FIG. 5 depicts an example embodiment of a user interface 500 presented in a mobile device (e.g., via an iOS mobile application) to enable a user to view files in my cloud.

FIG. 6 is a screenshot depicting an example embodiment of a user interface 600 for central management of the storage system. The management of the system, including accounts and business information, may be performed centrally (e.g., on a public domain, such as adeptcloud.com) even though the data is stored privately (e.g., on private nodes).

FIG. 7 is a screenshot depicting an example embodiment of a user interface 700 for managing computers and devices centrally (e.g., from a public domain, such as adeptcloud.com). As shown, the user interface 700 may allow a user to link or unlink computers and devices to and from with the user's account, as well as rename the computers and devices.

Figure 8:
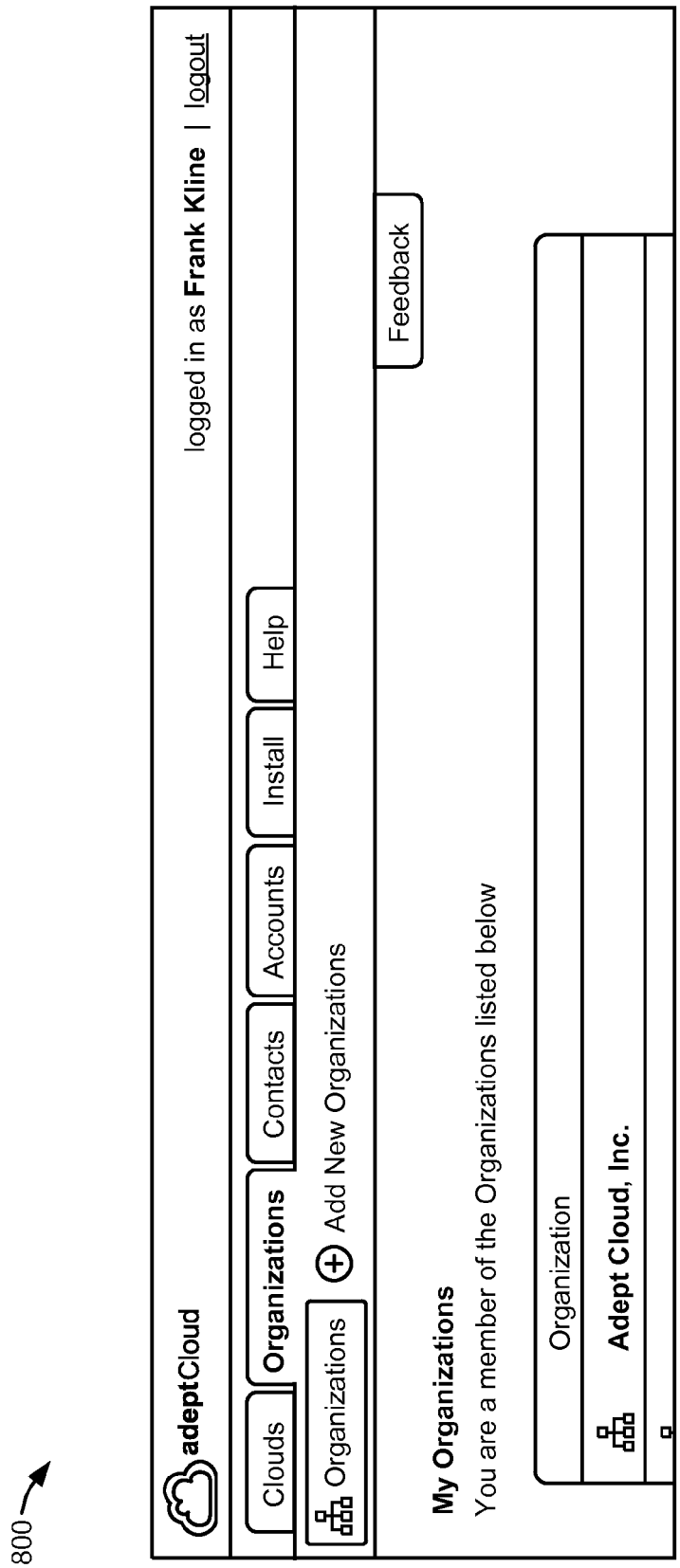
FIG. 8 is a screenshot depicting an example embodiment of a user interface for viewing organizations centrally.

FIG. 8 is a screenshot depicting an example embodiment of a user interface 800 for viewing organizations centrally. Such organizations may include one or more computers and devices that may be managed, as shown in FIG. 7.

FIG. 9 is a screenshot depicting an example embodiment of a user interface 900 for managing users and onsite services centrally. As shown, the user interface 900 may enable an administrator to manage users that have access to an organization. For example, the administrator may create a managed user or manage behind-the-firewall services for the organizations, such as the Onsite service.

In various embodiments, an infrastructure of a system includes one or more nodes and nexuses. A node may be deployed to users as desktop clients. Its backend may provide indexing and synchronization services to power both mounted cloud synchronization as well as the Cloud Browser.

The composition of the node may consist of a selection of important services and functions, such as those described below.

Directory Watcher. Mounted clouds may be watched by directory watchers, receiving notifications when files are changed.

Indexing Service. The indexing service may index files in mounted clouds, keeping track of their status as reported by directory watchers.

Synchronization Service. The synchronization service may retrieve updates from remote nodes about changes to files and synchronize those files locally that need to be updated for mounted clouds.

Index. The index may keep track of updates to local files in mounted clouds as well as a virtual representation of the state of unmounted clouds.

Cloud Browser. The Cloud Browser may display a global index (e.g., an index for both mounted and unmounted clouds). For unmounted clouds, the Cloud Browser may enable the user to download and upload files by interacting with nodes that have the cloud mounted. The Cloud Browser may be coupled to the Indexing Service to retrieve indexing data.

The Nexus may maintain security relationships between the nodes and in Clouds. It may be the central conductor and gateway for communication in the system. The system's web interface may also run the central Nexus. It is the central configuration management interface as well. The Nexus can be distributed in a cluster for redundancy and load balancing.

Remote Connections

In various embodiments, the system adds the ability for Nodes to communicate in non-local networks through the use of an external bidirectional proxy (e.g., an HTTP proxy). Various protocols (e.g., HTTP) may have a limitation in that the creation of a socket is tied to the person making the original request. This may be fine for a client connecting to a public server, but causes issues when a public client is trying to connect to a private (firewalled) server. A Relay Server enables the system to decouple the direction of the connection from who is making the request.

Figure 10:
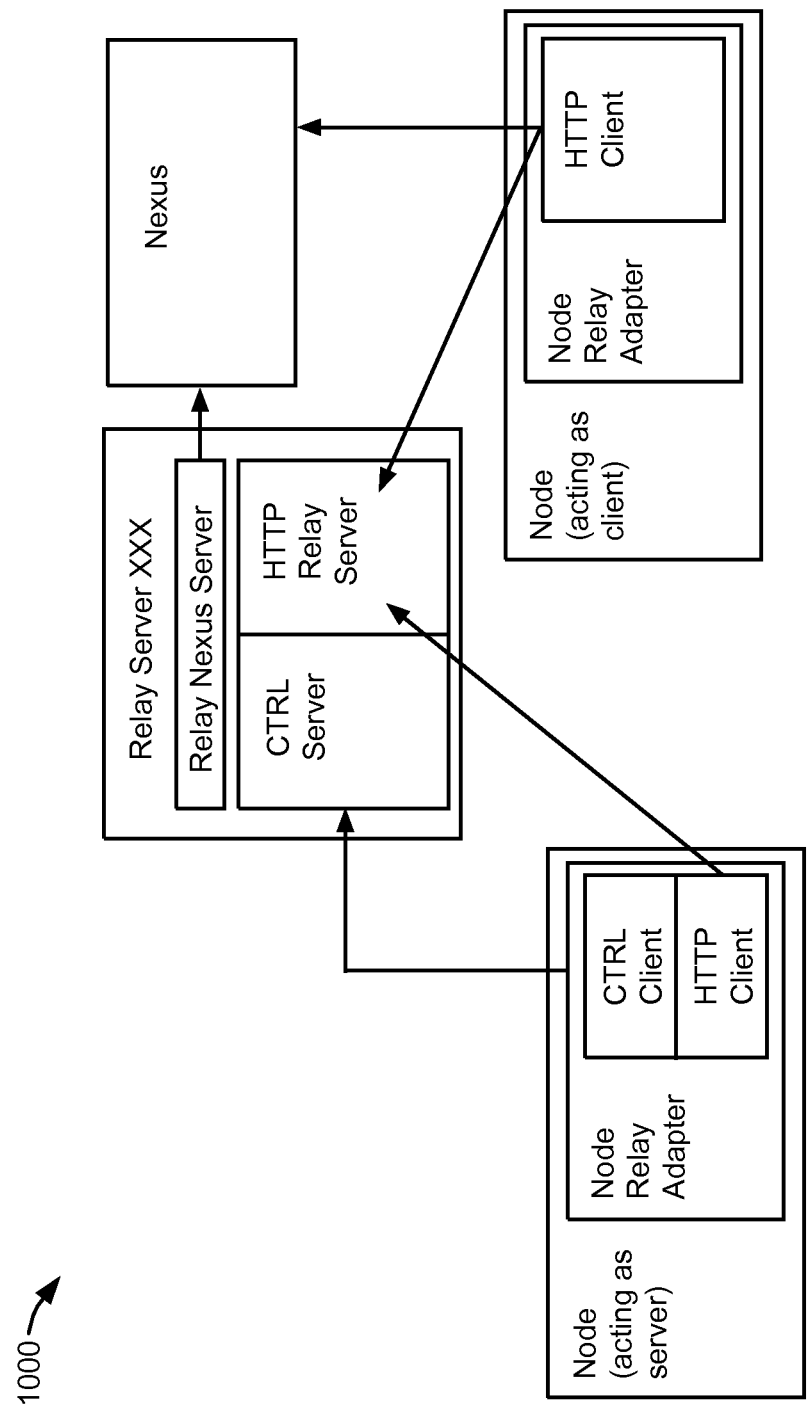
FIG. 10 is a block diagram illustrating an example architecture of the system.

FIG. 10 is a block diagram illustrating an example architecture 1000 of the system, including the relay described above.

In various embodiments, the Relay Server is designed so that it only requires incoming connections (i.e., that Transmission Control Protocol (TCP) sessions originate from Nodes). In various embodiments, an exception is communication with the Nexus, which is assumed to be bidirectional.

In various embodiments, the Relay Server may guarantee some level of performance in detecting if a Node is reachable. In various embodiments, the Relay Server does not need to change the existing timeout thresholds used in direct connection methods.

Figure 11:
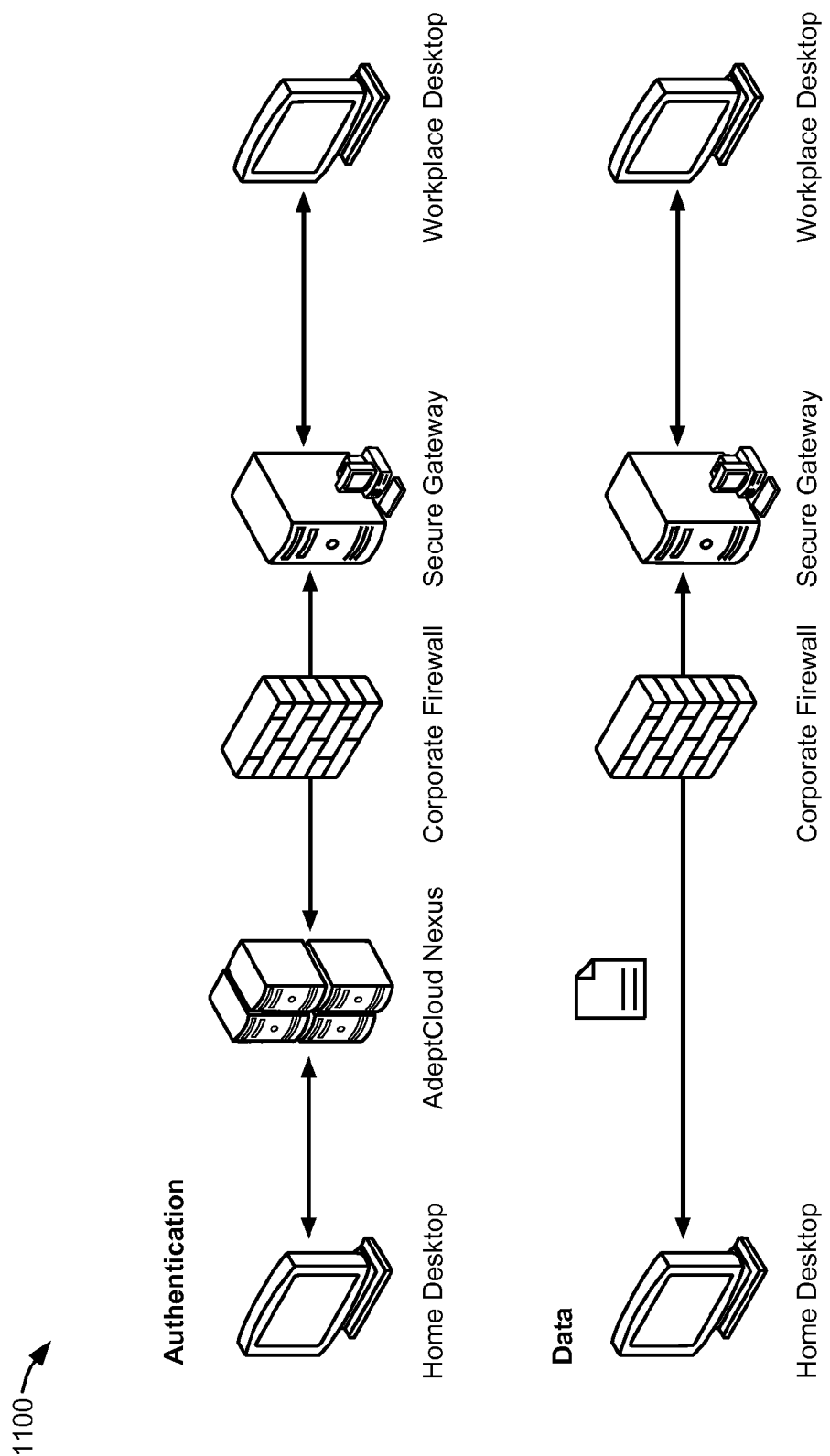
FIG. 11 is an interaction diagram depicting example interactions between components during authentication and data transfer.

FIG. 11 is an interaction diagram depicting example interactions 1100 between components during authentication and data transfer. The process may be started by Node A (the client, e.g., a Home Desktop) attempting to establish a connection to Node B (the server, e.g., a Workplace Desktop).

From the Client's Perspective:

1) Node A asks the Nexus which Relay Server Node B is registered with.
2) The Nexus responds with the Relay hostname to get to Node B (or if Node B is not found, it returns an error).
3) Node B makes an HTTP connection to the appropriate Relay Server, encoding the original request for Node A along with Node A's computer ID.
4) The Relay Server looks up the control session associated with Node A's computer ID.
5) The Relay Server sends a control message to establish an incoming HTTP connection from Node A to the Relay Server with a randomly generated session ID.
6) Node A makes an HTTP connection to the Relay Server, encoding its computer ID and the session ID in the header (no body).
7) The Relay Server forwards the request from Node B as the response to Node A's HTTP connection, again including the session ID.
8) Node A executes the request and establishes another HTTP connection to the Relay Server sending the result of Node B's request in the HTTP request.
9) The Relay Server forwards the result HTTP request from Node A in the response to Node B's original request, with no session ID.
10) The Relay Server sends a blank response to Node A indicating the relayed request is complete.

From the Server's Perspective:

1) Node B starts up and asks the Nexus which Relay Server it should use. It will always do this regardless of whether any clients intend to connect.
2) Node B establishes a control session with the Relay Server.
3) The Relay Server informs the Nexus that Node B is accessible from this Relay.
4) Node B waits until Step 5 in the above process.

In a use case, user A is behind a firewall or other network device preventing a local connection to User B. In this use case, the Nexus may delegate a new relay session dynamically for Node request (if the requested server node is considered online), find and query the relay server, and return this relay endpoint to the requesting Node. The Node may use this to establish a relay.

In various embodiments, HTTP timeouts may need to be long enough for the relay to function. Due to the CTRL port architecture, the Nexus may respond just as quickly (if not faster) when a node server is offline. External code may be used to address the switching logic (e.g., whether to use the relay or not).

The Relay Servers may have easy-to-query metrics, such as:

Current number of active control sessions (this indicates how many nodes are connected in the server capacity);
Current number of active relay sessions (aggregate);
Average number of sessions/node; and
Bandwidth (aggregate and rate).

The Relay Servers may present metric endpoints over the protocol interface (e.g., HTTP interface) to the Nexus for aggregation into the Nexus user interface.

The Relay Server may have the ability to deploy its logs over this protocol interface as well to the Nexus, thus enabling centralized administration.

The Relay Server may reconfigurable from the Nexus user interface. There may be a mechanism to force re-election of which nodes connect to which relay server in the case of failure or bad connectivity.

Sharing Infrastructure

The system may include a sharing infrastructure feature. The goal of this feature is to provide a flexible backend for our sharing infrastructure. This means the Nexus may support advanced features like access control lists (ACLs) for each share.

A secondary goal is to minimize the number of changes to the overall infrastructure in each phase of the build out. This lets the system or an administrator of the system go back and test and do a sanity check on the overall approach.

In a use case, user A wishes to share a folder with user B and user C that is synchronized across all of their machines.

It may help to think of shares like regular Nodes on a given user's network. The Nexus' existing endpoints may be slightly modified and used so that in general the shares work identically to the existing "my cloud" sync.

As used herein, a "share" is defined by the following elements:

UUID: The immutable unique ID assigned when the share is created. It is used to uniquely identify a share across the system.

ACL_ID: The access control list identifier which identifies which users have which permissions with regard to this share. Examples may include OWNER, READ, WRITE.

Friendly Name: This is what the user calls a share, which is simply a string that will usually end up being the name of the folder representing the share.

Implicitly, implementation of a share this necessitates the following:

The Nexus must maintain a list of all shares and govern the unique generation of the UUIDs;

The Nexus must resolve the ACL_ID into a set of permissions for a particular user;

The Nexus must enumerate which shares a user has access to;

The Node must be informed which Nodes contain shares it has access to;

The Node must be able to connect to other users' Nodes to synchronize shares;

The Node must be able to provide index information independently for each share;

The Node must NOT be able to connect to other users' Nodes that it does not need to synchronize shares; and The Node must NOT be able to synchronize anything except shares it has access to.

Initially, a share may be created with an owner. We'll assume User A uses a GUI to create a Share entitled ABCSHARE. In various embodiments, immediately after this event, the following happens:

The new share is added to the nexus DB. A new UUID is generated for this share (i.e., the SHARES table has a new record inserted with: UUID, "ABCSHARE", the SHARESACL table has a new record inserted with: UUID, UserA.UserId, PERMISSIONS (READ=true,WRITE=true, OWNER=true));

The nexus forces a Share Data Refresh on User A;

At this point, the share is now available in the system infrastructure and is only accessible to User A's Nodes;

On the Share Data Refresh, a list of available shares, which currently is our one new Share (List<Shares> contains one element: (UUID, "ABCSHARE",ACL));

The Node checks its cache of shares (empty) against the list received in the Share Data Refresh (UUID,"ABCSHARE", ACL);

The Node identifies this as a new share and automatically creates a folder "ABCSHARE" in the % USERDATA %/Shares folder (this is known as the "mount point");

The Node updates its cache of shares and associates the mount point: % USERDATA %/Shares/ABCSHARE with the UUID. This association is stored locally on the node only using the Folders service. Logic will be needed at some point here to handle the case where the mount point already exists; and The Indexing Service is told to begin indexing the new share (the Indexing Service must be made aware of an indexed path's UUID, the System Properties table must now track an Index Revision for each UUID in addition to the Index Revision for "my cloud" or the endpoint must calculate this dynamically from the Index table).

Now this node is prepared for synchronization of updates with other Nodes. The following paragraphs describe the synchronization sequence with the shared folder.

First, Nodes Heartbeat with Nexus.

The heartbeat message may have an optional list of "desired" UUIDs which represent the Share UUIDs for which sync information is also being sought;

The Heartbeat message may return a set of UUID-ComputerInformation tuples. (The computers belonging to "my cloud" may have an implicit UUID of 0, and shares owned by other users computers will have a UUID matching that of the share. This allows the node to resolve where assets are based on the assets' UUID);

The Node (or Nexus) may collapse this returned message to remove duplicate computers and creates a list of available UUIDs for each computer. This is stored in a Share Location Service on the node; and The handshake process may occur, and modifications in the nexus may allow for sessions to be granted between nodes that have READ or greater access to other nodes via shares.

Second, the Node Synchronization Service now may iterate through the normal connected computers as well as others that may have our share. For computers that have a UUID of 0, the same existing logic is followed. For computers with a UUID!=0, we follow similar logic for my cloud except, for example:

The ACL is checked before each operation to see if that operation is permitted;

The remote revision given is the remote revision for that UUID;

The index is updated against that UUID; and folders are synced to that UUID's local mount point.

Third, independently, the Node External Service may check its local ACLs before allowing nodes to perform certain operations. Currently all operations on this endpoint are READ ONLY except upload, but all should perform an ACL verification.

In various embodiments, if a user deletes an entire shared folder, this may not be automatically propagated by default, unless the user does it from the web UI or confirms with a dialog on the node, for example.

In various embodiments, the system specifically logs ACL failures at the nexus and node. This may indicate that a node is very close to being able to do something it shouldn't be able to, most likely pointing to a bug in the client side ACL enforcement code.

The above description assumes a single session between two nodes that may be used for accessing data granted under many different ACls. For instance, if two nodes have ten shares that they both independently belong to, only one session token may be given by the nexus.

The ACL cache on the client side may be used to eliminate useless (non-permitted) queries from a client node to a server node. Therefore, it may only be necessary to send down the ACL from the perspective of the requesting client, and instead perform the ACL enforcement on the nexus (in the same call as the session keeping).

In various embodiments, the renaming/moving of share mount points works the same way as with the my cloud folder implementation.

Nexus Session Updates

To start the process of migrating to nexus-managed sessions between nodes, we'll need to move to a better structure for tracking the sessions each node keeps with the nexus, the Nexus Session. This Nexus Session is activated by calling the nexus' "refresh" endpoint with a valid ComputerToken.

This Nexus Session is considered valid in various scenarios, such as:

The client has consistently heartbeated with the nexus at within some interval (the nexus session reaper interval);

All ACLs the user is a part of have remained constant since the time the nexus session was created (the user ACL revision is current); and The Time Ended stored for the nexus session is NULL.

FIG. 12 is a table illustrating examples of data items 1200 that each nexus session may persistently keep track of. As shown, the data items 1200 may include a nexus session ID, a nexus session token, a computer ID, a user ID, a user ACL revision, a time created, or a time ended.

The Time Ended will become NON-NULL if the client fails to heartbeat within the nexus session reaper interval or if the ACLs the user is a part of change.

In various embodiments, the User ACL Revision is instantiated before a session is created. This alleviates any race conditions (e.g., if the ACL revision is updated via a race condition).

Node Session Updates

In various embodiments, node session management and canonical storage is performed at the nexus. Node sessions are created by a client requesting to handshake with a node that it has access to data from.

In various embodiments, this Node Session is considered valid in various scenarios, such as:

The From & To Nexus Sessions that this node session was established under are valid (The To Session is important in case the To computer goes offline); and The Time Ended stored for the nexus session is NULL.

FIG. 13 is a table depicting examples of data items 1300 that each node session may keep track of. As shown, the data items 1300 may include a nexus session ID, a nexus session token, a From ID, a to ID, a from nexus session ID, a to nexus session ID, a time created, or a time ended.

The Time Ended will become NON-NULL if From or To Nexus Sessions become invalid or if a Nexus Session is deleted. In various embodiments, node session storage referencing these deleted nexus sessions will be lost.

During client heartbeating with nexus, the nexus can check open sessions to other computers and get the index revision numbers for those other nodes the client has access to. In various embodiments, node index revisions are kept track of in the nexus, as well as lower the heartbeat times, so sync can happen more quickly.

Encryption

The goal of encryption may be to prevent attackers or unprivileged users from reading data or spoofing data between the nodes or between the nodes and nexus.

In various embodiments, the encryption feature makes sure of the following:

A message cannot be read by any third party;

A message cannot be replayed long after it was originally sent; and

It may be verified that the message was not modified in any way during transmission.

The system may implement the encryption feature by using a combination of techniques, such as:

Advanced Encryption Standard (AES) encryption (e.g., to try to make it impossible for any third party to read the data);

Changing the Key for the AES encryption and the hash-based message authentication code (HMAC) (keyed-hashing for message authentication) at some time interval and using a different key for every pair of nodes;

Using SHA-1 and HMAC algorithms (e.g., to guarantee message authenticity); and

Changing the secret key required by AES and HMAC over time (e.g., to accomplish replay attack resistance).

FIG. 14 is a description of an example embodiment of a description 1400 what message construction may look like.

In various embodiments, communication between a node and a nexus will use standard SSL for authenticity, integrity and encryption.

Encryption may be used for password protection.

Encryption may be used for access restriction/authentication.

Encryption may be used to encrypt additional information (e.g., general network traffic, message data, or video data).

In various embodiments, the "nexus" is a central server software stack. "Nodes" are clients that are deployed to and installed on user computers and devices. A "node client" is a node that is requesting information in a transaction between nodes. A "node server" is a node that is serving information in a transaction between nodes.

In various embodiments, for node-nexus communication, industry standard SSL is used with 256 bit AES encryption in code-block-chaining mode, SHA1 message authentication and Diffie-Helman RSA assymetric key exchange.

In various embodiments, for node-node communications, 128 bit AES is used in code-block-chaining mode with PKCS#5 padding and SHA1 message authentication. The implementation encrypts the 'data' content of messages used in a proprietary protocol between nodes on the Adept Cloud network.

In various embodiments, for node-nexus communication, asymmetric keys are managed using traditional SSL Public-key infrastructure (PKI). The system may have a wildcard SSL certificate whose private keys are known only to the system; public keys are verified by a trusted SSL root authority. The signature used may be SHA-1 RSA, and the key modulus is 2048 bits.

In various embodiments, for node-node communication, symmetric encryption keys are distributed by way of the node-nexus SSL communication layer. The private keys (and other metadata) may be sent to nodes on demand and upon certain exceptional events (such as a user permission change). In various embodiments, node-node keys are never stored on node clients except in temporary memory (e.g., RAM) and have a maximum lifetime of 24 hours. In various embodiments, no asymmetric encryption is used for node-node communication, so no modulus sizes are supported.

In various embodiments, the plain text consists of proprietary messages that define the protocol used between nodes and nodes-nexus. Some of these messages may be compressed using gzip or other industry-standard data compression techniques.

In various embodiments, node-nexus communication uses standard SSL after which no further post-processing methods are applied to the ciphertext.

In various embodiments, in node-node communication, the ciphertext is encapsulated with an unencrypted message header and an unencrypted message footer. The message header may consist of a hashed client identifier, the length (in bytes) of the message ciphertext, the IV (initialization vector) used to encrypt the ciphertext (randomized for each message) and SHA-1 HMAC of the unencrypted message header to authenticate the header contents. The message footer may contain a SHA-1 HMAC of the union of the message header and the ciphertext. Node-nexus communication may employ standard SSL over TCP using TLS1.0 or greater.

In various embodiments, node-node communication may support only a proprietary encryption protocol over TCP or UDP.

In various embodiments, node-nexus communication may make use of a Java SSL library (e.g., provided by Oracle), which inherently prevents user modification of encryption algorithms, key managements and key space.

In various embodiments, node-node communication uses a proprietary protocol which does not allow for protocol negotiation. This may prevent users from modifying the encryption algorithms without being denied access to a remote resource. Key management may be enforced for both the client node and the server node by the nexus, so in the event a client attempts to use an old or invalid key, the node-node communication will be terminated as the key will be denied when the server nodes attempts to verify the invalid key with the nexus.

In various embodiments, centralized key management is performed for all users by the system infrastructure (e.g., the nexus). This means there may be a number of encrypted data channels equal to the number of active computers on the system, which may be equal to the aggregated number of computers owned by each user.

Organizational Structure

Businesses may critically need to be able to create an organization in the system, in which they can manage users and their data centrally.

Here's an example use case: I'm an Administrator of an Organization and I want to deploy the system fully set up for my organization. As an administrator, I need to be able to add users. As a user of an organization, I want my teammates to be initialized to all members of my organization. As an administrator, I want to be able to create and manage clouds. P3. As an administrator, I want to be able to see and manage all computers/devices in my organization.

Organizations

An organization is a managed set of users and resources. An organization may have one or more super-administrators. In various embodiments, organizations are not to be tied to a specific domain. For example, soasta.com and gmail.com email addresses may be used in the same organization.

Super-administrators may have an option to restrict sharing to only users within the organization.

In various embodiments, users only have an opportunity to be a member of a one organization. If an administrator attempts to add a user to an organization and the user is already in another organization, there may be an error thrown back and presented to the administrator. Users may be invited to more than one organization if they haven't accepted an invite into an organization yet.

Role Based Security

In various embodiments, the system uses a permissions-based access control system that is notionally tied to cloud privileges (e.g., for a given cloud, a user will have permission (e.g., Owner, Write, Read, None)).

In various other embodiments, the system uses a privilege-based, resource-centric access control system.

A resource is an entity within the Adept Cloud system, such as an organization or a cloud, that requires users to have specific privileges to perform specific actions.

A role is a set of privileges. In various embodiments, native roles are assigned to group common privileges into colloquial buckets. For example, Role.CLOUD_READER will include Privilege.VIEW_CLOUD and Privilege.READ_CLOUD_DATA.

A privilege is a positive access permission on a specific resource. Each privilege has an intrinsic role for simplicity of defining ACLs in implementation.

An access control list for a resource may map users to roles. User access queries on an access control list may return a set of all roles.

A catch-all role of ROLE_NONE. ROLE_NONE may be added. In various embodiments, this role can never be granted, and is only returned upon queries for user privileges on a resource when the user has no granted privileges.

In various embodiments, required information for organization creation includes the name of the organization and email address (e.g., provided by an administrator).

The system may create an organization. If an administrator is not an existing system user, the system will create a new system account for the email address used for signup. In various embodiments, the does not send an activation email to the user yet.

The system may set the administrator's system account as a user of the organization, with role ORGANIZATION_SUPER_ADMINISTRATOR.

If the administrator was not an existing system user, the system may send an activation email now.

Administration features of the system may include the following:

An Admin tab available to any super-user;

The Admin tab may have applications (Users, Clouds, Computers, Settings);

A Users application that enables ORGANIZATION_USER_MANAGERs to create a user for the organization with options to set their authentication and metadata information, send an activation email tailored to the organization, highlight the name of the organization in the email and in the activation page; invite an existing cloud user to join their organization; view, modify, and/or delete organization users; view, modify, and/or delete user computers and devices if the administrator is an ORGANIZATION_COMPUTER_MANAGER;

A clouds application that enables ORGANIZATION_CLOUD_MANAGERs to add/view/modify/delete clouds, managing any cloud created by any organization user;

A computers application that enables ORGANIZATION_COMPUTER_MANAGERs to view/modify/unlink computers and devices registered to users of the organization;

A settings application that enables ORGANIZATION_SUPER_ADMINISTRATORs to add/view/modify/remove users with admin privileges; view/modify organization-wide settings; optionally limit cloud membership to organization users only; delete the organization and all its users.

In various embodiments, for user organization mapping, organization membership will be strongly tied to a user object.

Backup and Versioning

Before deploying the system, a backup and versioning system may be installed to enable the system to recover data in the case of accidental misuse by users or a bug in the system software.

The backup and versioning system may include the following features:

Maintain a copy of all entities (clouds) for an organization;

Serve as a data source for nodes/mobile clients to sync with;

Maintain a history of changes made to the files inside the entity; and

Have the ability to browse to and serve up specific revisions of the files in an entity from a fat client.

In various embodiments, the backup server is able to serve an organization with a predetermined number of users without becoming a bottleneck and is not to delete files off its file system (e.g., it is only to be able to write metadata that the files are deleted). This will allow the system to have a better guarantee that it can't possibly permanently lose data due to a programming or user error.

In various embodiments, the backup server is backed by a data store that includes the following features:

Independent across entities (e.g., so corruption in one entity doesn't result in a total loss across the organization);

Simple to backup and restore (e.g., performing a backup of a "data" directory is enough to recreate the entire state in case the backup server computer needs to be restored); and Eventually scalable so backup servers can be used in parallel or have the workload split in some way between multiple instances.

In various embodiments, the backup server consists of three major components: (1) a Synchronization Service that polls the nexus for revision updates on each node and then contacts each node to get the contents of those revisions; (2) a Revisioning File Storage Service that provides the backing store for the data content, maintains a revision history on a per-file basis, satisfies the no-delete constraint, intelligently stores revisions to files so as not to use an exorbitant amount of space; maintains an index of the head revision plus all other revisions; (3) a Restore Service that provides the endpoint and backing services for clients to browse for and retrieve versions of backed up files, mimics the existing endpoints for synchronization to the head revision for regular nodes (so standard nodes can sync with the backup node), and works in tandem with the Revisioning File Storage service to actually retrieve the file listings and data itself.

In various embodiments, the Synchronization Service works mostly like a synchronization service that a node may already have. The general cycle is for a particular entity: (1) Contact the nexus to get the current revision numbers for all other nodes of that entity, and (2) Loop through each node: compare a locally cached revision number for that node against what was received from the nexus; retrieve a list of updates from the node by issuing our last cached revision number (getUpdates); relay each update operation to the Revisioning File Storage Service; and upon success, update the locally cached revision number for that node.

There may be differences between the backup server's sync service and the node's sync service. For example, the backup server may have one sync service per entity instead of one per server; the backup server sync service may use thread pools instead of an explicit sync thread; the backup server sync service may not have a lock service since its indexing service is only accessed by the sync service (i.e., not the file system (FS) watcher) (alternatively, entity scope locking could be used); and the backup server sync service may send FS operations to the Revisioning File Storage Service instead of performing them directly on the FS.

Even if the backup service never modified files, a conflict can still occur. For example:

Node A, Node B, and backup server S are in the same entity.

Node A modified a file F offline.

Node B modified the same file F offline, in a different way.

Node A comes back online first, and now Server S gets node A's file, F(A) [A-1].

Node B comes back online later, and Server S tries to get node B's file F(B) [B-1].

Server S detects the conflict.

In such cases, the system may detect a fork and start tracking revisions independently. In various embodiments, the backing store is aware of the versioning clock. In other embodiments, the system may just pick a revision to track (e.g., the first one) and ignore all conflicts. However, if the wrong revision is picked, data could be lost.

The Revisioning File Storage Service is the heart of the backup and versioning service. Effectively this component acts as a write-only, versioning file system that is used by the Backup Synchronization Service (above).

Verbs used by the existing Synchronization Service may include the following (see doUpdate):

Directory Functions:
Delete Directory (recursive); and
Create Directory (recursive).

File Functions:
Delete File If Exists;
Write File; and
Read file.

Think of each entity as having a different revisioning file system (RFS) where that entity acts as the root of the FS.

At the basic level, the RFS provides all the features of a regular FS, namely being supporting the reading, writing and deletion of files and the creation and deletion of folders. It differs in the following ways:

When a file is deleted, the contents of the file are not actually deleted. Instead, some metadata is changed so the FS reports the file as being deleted;

When a folder is deleted, the contents of the folder and files in the folder are not deleted. Instead, the metadata for that folder and its children are changed; and When a file is written to, it is not overwritten; instead, data is stored so that the new revision and some number of previous revisions can be generated upon request.

The FS has the concept of a "revision", which is a number that represents a global state of the file system.

The FS supports queries such as the following:
Return all revisions where file X changed;
Return all revisions where directory X changed;
Return file X at revision R;
Possibly return directory X at revision R;
Return all revisions back to date D (implies a map from D→revisions).

In general, each "transaction" on the FS increments the revision by one. When a user is browsing the FS, they generally do so against the head revision (the global maximum), as this should reflect what a standard FS would look like.

In various embodiments, each file or directory full modification constitutes a transaction. A full modification means a full replacement of the file, so intermediate edits by something like Rsync would not result in a new transaction as this would cause files to have an invalid state.

A possible candidate implementation is Revisioning Index+Native File System. In this implementation, every file and folder is stored on the native file system as normal. In addition, the cloud has a revisioning index which is a database that contains an entry for each file/folder action and its metadata as well as some global metadata for the database itself. Note that the data stored in the database may be tightly coupled to the underlying file revisioning strategy. The database has a row for every single revision of every file/directory. Therefore, the row ID ends up being the revision number.

FIG. 15 is a table illustrating an example embodiment of a database table 1500 for an example candidate implementation of a revisioning file storage service.

The database table 1500 includes the following fields:
revision—the PK (e.g., primary key) of the table, an incremental counter that effectively=row index;
filename—the relative path of the file in the entity. The filename is the same for both directories and files;
directory?—indicates if this is a directory;
deleted?—indicates if the file is marked as deleted;
adler32—the adler32 checksum of the file, 0 for directories;
size—the file size, 0 for directories;
file timestamp—the propagated time stamp of the file;
backup timestamp—the time when this record was inserted;
version clock—the version clock associate with this operation; and data loc—the "pointer" to the data for this version (in the most basic case, this is a file location on the hard drive; Null for directories).

In various embodiments, the Restore Service is just JSON endpoints (and possibly a rudimentary GUI/CLI).

Endpoints May Include (Similar to Existing Nodes):

browseRevisions—Input: Relative Path (string), UUID (long), fromRevision (long); Output: List of Browse Elements (augmented with revisions). Returns immediate children elements of a particular path between the fromRevision and the HEAD. Relative Path may be a folder that existed between fromRevision and Head, otherwise error;

retrieveFileRevisions—Input: Relative Path (string), UUID (long), fromRevision (long), Output: List of Browse Elements (augmented with revisions). May return only revisions for the requested file, as a file (meaning if this path was once a directory, those are omitted from this response). Relative path must be a FILE that existed between fromRevision and Head, otherwise error;

retrieveFileAtRevision—Input: Relative Path (string), UUID (long), revision (long), Output: file, Relative path may be a FILE that existed between fromRevision and Head, otherwise error;

getRevisionFromDate—Input: Revision (long), Output (Date (UTC)).

Deployment

The system is easily deployable (e.g., by an organization's IT staff). The process is painless and avoids messing with configuration scripts and the like.

Initially, the Storage Agents will be deployed by the system at select customer premises. If allowed, log-me-in or some remote access solution may be installed so that the system can be managed remotely after on-site deployment.

In various embodiments, Storage Agents will: automatically download updated Storage Agent software similar to how nodes do now and be able to install updates from a central web interface.

In various embodiments, the "unboxing" experience includes the following steps:

An organization admin (or similar privileged organization user) downloads a "special" storage agent from the nexus;

The setup package is real-time injected with a unique token identifying which organization it is associated with;

The installer requires the admin to enter the storage agent daemon password for the org;

The installer asks the administrator for a name to identify this storage agent;

The installer asks the administrator for location(s) to store backups;

The installer optionally presents the administrator with different backup strategies (e.g., how long to keep data, etc.) and whether the backup server should be enabled now; and The installer installs the application as a service.

Once this is complete, the Storage Agent application is entirely managed from the nexus.

Access

In various embodiments, the access service may be a component of Onsite. The access service may give organizations the ability to give their users the ability to access their clouds from a web browser.

In various embodiments, a user (e.g., an employee of an organization) uses the access component to:

Download files in any of my clouds;
Upload files to a specific folder in any of my clouds;
Delete files in any of my clouds;
Search for files by name in one or more of my clouds;
Rename files or folders in any of my clouds;
Move files or folders within the same cloud for any of my clouds;
Access a file on a particular computer that is not in a cloud already;
Access previous revisions and deleted folders/files;
Get a link to a file the user can send to someone else who already has cloud access;
Get a link that is public to the external world (e.g., no username or password);
Comment on files, see previous comments, and subscribe to a comment feed;
Subscribe to a feed for file modifications on a server (this is a hand-in-hand feature with storage agents);
Browse pictures and videos (e.g., in a thumbnail view); and
View content for media (e.g., in a special shadowbox with OTF video conversion where appropriate).

In Various Embodiments, an Organization Administrator Uses the Access Component to:

Control at a user level who can use the access server;
Control at a cloud level whether access servers can access a cloud;
Have the same controls enforced as if files were accessed via a node; and
Have similar guarantees of the time it takes for an access list modification to take effect.

Figure 16:
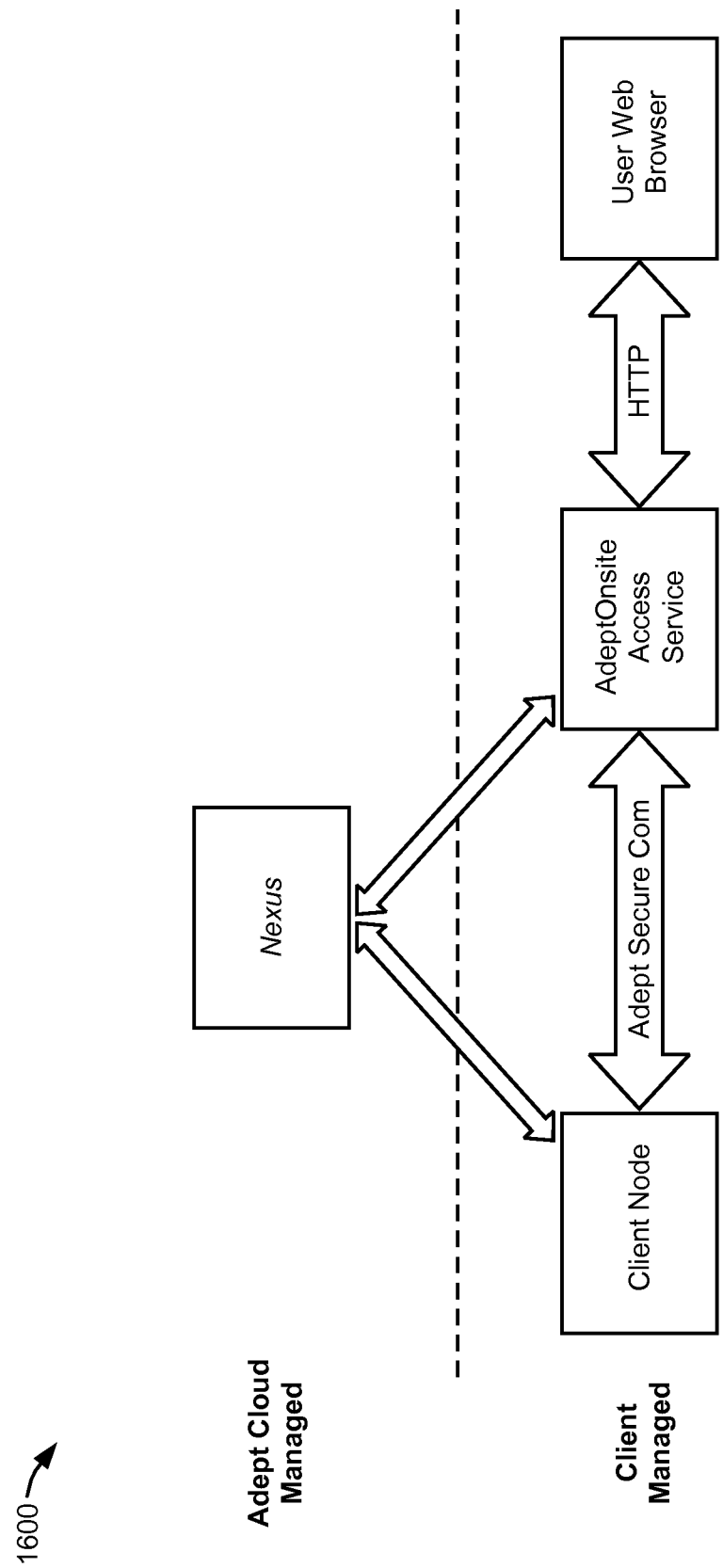
FIG. 16 is a block diagram depicting an example embodiment of a design of the access component.

FIG. 16 is a block diagram depicting an example embodiment of a design 1600 of the access component. In various embodiments, the system is referred to as "AdeptCloud" and the Onsite component is referred to as "AdeptOnsite."

In various embodiments, the access service acts a lot like the mobile clients on one end and on the other end serves an HTML user interface.

Effectively, every user who logs into the access service (using their system credentials) spools up a virtual node-like client which communicates with other nodes as if it itself were a node.

There is a fundamental issue at hand with the access server specifically that the user expects the state modifications they make to be guaranteed to propagate throughout the system. However, if the node the access server happens to connect to goes offline before the changes propagate, this assumption will be violated and result in user frustration. The system has various options for handling this issue.

One option is a thin "node-like" layer that sits in the access service that allows changes to be served right from the access server as if it were a node. In various embodiments, this layer serves until the changes propagate "sufficiently". Sufficient propagation may be based on propagation to a fixed number of peer node or a percentage of peer nodes. Sufficient propagation may be based on a time out.

Communication. Peers may make an incoming connection to the access server in order to get the changes (using retreiveUpdates etc.). Therefore, at some point messages may be dispatched to the appropriate "user handler" for which the message applies. The cryptoId may be sent to the nexus and the access server would then need to figure out not only who the remote user is, but which local user the remote node is trying to communicate with (which in turn may be answered by the nexus). The flow may be as follows:

A regular node request a cryptoId from the nexus as usual, asking to connect to the Access Server;

The nexus issues the cryptoId between the node's comp and the synthetic comp of the access server;

The node connects to the access server with this cryptoId;

The access server attempts to verify this with the nexus, but instead of using its synthetic computers nexus session, it uses a special nexus session for this purpose;

The nexus verifies the cryptoId and also returns who the intended computerId receiver was (which should be one of the synthetic comp IDs represented by the access server); and The request is forwarded to the appropriate access client.

Another option is to keep the simple design of running every RPC call on the node, effectively making the access server a message delivery system. However, instead of connecting to just a single node, the access server may connect to N nodes for the particular cloud the front end is editing. If a user has "low connectivity", i.e. only a single remote node is on, a small warning indicating this may be presented. With this option, fewer features may need to be custom implemented on the access server. This option may also support a future design where the always available node feature is handled by an external component running on the same computer (or even another server, perhaps a storage agent "lite").

In various embodiments, users may see all connected computers via the web UI as well as the associated job queue.

Another option is to make the web interface extremely transparent to the fact that it's connected to a single node, and even make the propagation information available in the web. Note that this is actually a small subset of Option 2.

New endpoints on the nodes: download file, download files, upload file (either new file or new version of existing file), rename a file (delete it and synthetic upload), delete a file, move a folder (and its contents) to a new location, move a file to a new location.

Node Feature Interactions. The node may have specific code which prevents the file system watcher from detecting changes made by the node itself from increasing its own version clock entry. In a similar way, these endpoints may need to make modifications to the existing files on the node, but may do so without the node changing the version clock for its own computer. Instead, these actions may change the version clocks by incrementing the entry for the synthetic computer which represents the user on the access server. This way future logging and auditing may ensure the version clocks always represent a truthful map of who and where edits were made. Additionally, the mobile clients may make use of these new endpoints, and the same guarantees may then be made about modifications made on those devices.

A note about real-time conflicts: some users may only use the web interface for downloading files, and this may always be made fast because downloading from the system has no effect on other nodes. However, in various embodiments, the modification endpoints will need to "run to completion" before returning, and in order to maintain consistency, the web UI may also wait for these operations to complete on the connected node before returning control to the user.

Auditing

In various embodiments, the audit server gives visibility into the health of the system and provides a central repository for logging user, file and security events.

Auditing may be broken down into three primary categories:

1) Nexus logging—User level events, ACL changes, org changes, server config changes, etc., in the nexus;

2) Cloud-level logging—Tracking the version and history of individual files, who edited, where, on what device, etc. (storage agent);

3) Transaction-level logging—This is node-node communications used for figuring out when two nodes sync.

Furthermore, each audited event may be "visible" to certain principals, depending on the event. This is because certain "container" roles change over time, and should have retroactive access into an audit trail. For instance, a new IT administrator may be able to access audit history that occurred before their sign on date. However, users who join a cloud may not be able to get access to audit history before they joined. In various embodiments, the goal of the audit server is to record enough information at the time of the audit event to extract these security relationships when the data needs to be accessed.

FIG. 17 is a table illustrating an example embodiment of nexus logging particulars 1700 for three classes: user, organization, and cloud. In various embodiments, global system visibility allows a super-admin to see all events at the nexus level.

FIG. 18 is a table illustrating an example embodiment of cloud-level logging particulars 1800. In various embodiments, this logging is done exclusively at the cloud level. Most the data may come from the storage agents with some of the same data coming from nexus just as above.

Transaction-Level Particulars. This type of logging may log when nodes communicate with each other and what they say. In various embodiments, this is just the sync pipeline, which is a combination of RetreiveUpdatesSinceRevision and RetreiveFile.

The nodes may log both the server and client sides of a connection; this way, if either node is compromised or if only a single node is "managed", both sides of the transaction can be found later.

The difficulty here is that these logs may contain sensitive data that the nexus should not be able to see. There are at least two ways to address this problem, one using PKI, the other using direct communication.

In various embodiments, the PKI system works as follows:

A private key is generated by the audit server for an organization. The public key is then sent to the nexus;

When a node logs in, it is delivered the public key for the single audit server it needs to communicate with;

Log events are encrypted with the public key before being sent to the nexus. The nexus then queues these events to be sent to an audit server; and The audit server retrieves the events and can decrypt them with its private key.

In various embodiments, the direct communication system works as follows:

Nodes locally "cache" every audit event to a local persistent store on the node (e.g., the database);

Asynchronously the node connects with the audit server and delivers updates; and At some interval, the node must optionally handshake with an audit server to avoid totally orphaned nodes from never delivering their logs (this could be an organization parameter).

A user interface may enable users to perform the following actions:

Generate reports from combined nexus-level and cloud-level data;

View a geographic snapshot of where some filtered number of clients current are (or where they were at some point in time);

View server usage for relays, storage agents, access servers, etc.; and

View Statistics (e.g., of logins, time since last login, failed logins, last IP, email, and so on).

Advanced Indexing and Synchronization

In various embodiments, the synchronization service supports the access server (e.g., browser client) and improves performance for the sync service, including decoupling the indexing, synchronization and filewatcher services. The synchronization service may have the ability to handle conflicts. The synchronization service may also maintain index information from all nodes in mounted and unmounted clouds. Every node may have the version clock of every file in the mounted cloud. The synchronization service may provide file level information of what's available and what's not on each node in the network. The index may be able to handle the thin mounting concept.

Use cases may include the following:

A user wants to access data from any computer in the world;

A file is modified offline on two nodes and a conflict is created (e.g., user wants resolve the conflict);

A user wants more performance out of the node client;

A user wants to browse unmounted clouds;

A user wants to download data from an unmounted cloud; and

A user wants to upload data to an unmounted cloud.

The synchronization server may support the following workflows:

Mount an entire cloud;

Mount a portion of a cloud;

Unmount a portion of a cloud; and

Unmount the entire cloud.

Changes to the index data in the database may include:

Status bit if available locally (don't need to explicitly list this—can do a lookup in the availability table);

List of computers that have the head revision—via availability table;

Head version clock;

On update copy local version clock to head version clock;

Local version clock;

Add availability table with each id maps to an entry in the adept_index and each column is a computer UUID in the cloud (could truncate the list of computers);

On update—create table availability; and

Copy the files in the current index NOT marked as deleted to the availability table with existing computer_id.

The indexing service may support the following features:

Decoupling the updates to the index and updates to the content;

Only propagating "local" updates to the index;

Updating when a cloud is unmounted to remove all elements in the availability table to not include the local machine; and Updating when a cloud is mounted to include all local files in the availability table to include local machine.

In various embodiments, there exists a counter on the nexus that tells nodes when they should talk to each other. This may be the primary mechanism that nodes use in the SyncService and NodeExternalServices to communicate.

Figure 19:
FIG. 19 is a table illustrating example fields included in a database table for indexing.

FIG. 19 is a table illustrating example fields included in a database table 1900 for indexing (e.g., adept_index). As shown, the example fields include index_id, computer_id, and version_clock.

In various embodiments, the adept_index table includes a locally_available column, and stores information about unmounted clouds in addition to mounted clouds. Locally_available is a Boolean to indicate whether the PATH is available on the local node.

SHARES may include all clouds (UUIDs) and include a new field to indicate if the cloud is mounted (not just a null PATH). A column "mounted" may indicate if the cloud is locally mounted. Clouds in the SHARES table may be assumed to be mounted.

The following paragraphs describe example steady state operations for the various services.

SyncService: (a) synchronizationServiceThread.performAction—loop over all UUIDS, not just mounted ones (do not skip if folder service getFolder( ) call returns null for unmounted UUIDs); call syncWithComputer any time; do not call setRevisions for unmounted clouds to tell the nexus your local revision is zero for that cloud; (b) syncWithComputer: mounted clouds—call doUpdate and only update the index once the transfer has completed and the hash equality checked; unmounted clouds—a couple of options. Option 1: User the current check to the foldersService to see if a cloud is mounted by checking if the folder is null. If so, process the IndexedPathUpdates via the IndexingStorageService, set the updated remote revision via the foldersService and move on; Option 2: Explicitly check at the beginning of the function if the UUID is mounted via the SHARES table. If not mounted, process the IndexedPathUpdates via the IndexingStorageService, set the updated remote revision via the foldersService. In various embodiments, a type of SynchronizationEvent indicates that just index information is being shared, but this may happen very quickly and perhaps frequently.

IndexingService: (a) mounted clouds—the fileWatcherEvents may be the primary mechanism for updating the index; (b) unmounted clouds—no FileWatchers are enabled, so the unmounted clouds may not interact with the IndexingService via the QueuedIndexEvents.

IndexingStorageService:

doUpdateIndexedPath—add computer_id to call, update corresponding element in adept_availability table;

doAddIndexedPath—add computer_id to call, add corresponding element in adept_availability table;

getUpdatesSinceRevision—perform join query to indicate not just the data in adept_index, but also information from the adept_availability table to indicate if the corresponding element in the adept_index table exists on the given compputer (assumes this will populate the IndexedPath available with the current node computer_id from the availability table);

getIndexedPaths—if the IndexFilter support a computer_id, this needs to include only data that persists on a given computer_id;

getMaxIndexRevision—by grabbing the data from the SHARES table, this suggests the SHARES table might need unmounted cloud revision information getIndexRevision—like getMaxIndexRevision, persist data on unmounted clouds in SHARES table;

incrementAndGetCurrentMaxRevision—see getMaxIndexRevision for thought on persisting data on unmounted clouds in SHARES table;

overrideIndexRevision—see getMaxIndexRevision for thought on persisting data on unmounted clouds in SHARES table;

clearIndex—Clear the specified UUID data from the adept_availability;

NodeExternalServices: changes in the IndexedPathResultSetHandler may propagate the unique identifier if an IndexedPath is mounted (and thus available on a given node).

IndexedPath: A field may indicate if the IndexedPath is available on the node returning the IndexedPath.

IndexedPathResultSetHandler: A translation may set the available field in the IndexedPath based on the data returned from the IndexedPath query.

IndexFilter: In various embodiments, has the ability to filter based on data that persists on a given computer_id from the availability table.

Initial Upgrade:

Update the database configuration to current number +1;

Provide an upgrade task and new upgrade SQL file with the following commands: Create the new adept_availability table; copy all of the (id,version_clock) from the current adept_index table to the adept_availability; assign the computer_id of the current node from the system_properties table to all elements in the newly created elements in the adept_availability table; get the available clouds and put into SHARES table.

Mounting a cloud: invokes the foldersService.setFolder-Path function; foldersService, setFolderPath; unmount-Folder—unmounting and clearing the data from the index will cause all remote nodes with this cloud mounted to give the most up-to-date information because the local remote revision will be out of sync with the nexus.

Unmounting a cloud: Invokes the foldersService.unmount-Folder; foldersService; unmountFolder:

Option 1: add additional call (and always run) to increment the local IndexRevision number (how does this get pushed up to the nexus);

Option 2: add another method to explicitly unmount and increment. This would allow other methods that don't need to increment the index revision to unmount a folder without incrementing;

Option 3: Put the call to the nexusClient at the CloudController level.

Federation

In various embodiments, nexus infrastructure may be federated for redundancy and load balancing.

Public Key Infrastructure (PKI) Solution

Environments with highly sensitive data may be worried about the insider threat. For example, what can an internal system employee with access to the entirety of internal system resources do if they decide to try to get at someone's data?

A high-level solution may be to partition the location of the sensitive data and partition how access to data is granted. This solution may be realized with a standards-based PKI (Public Key Infrastructure) solution.

In various embodiments, there are two functions of the overall system: (1) Identification—provide identification for two peers who are communicating and (2) Authorization—authorize one peer to access a resource from another peer.

In various embodiments, the PKI feature addresses problem 1, and provides a way for organizations to fairly easily substitute out the nexus for their own PKI solution.

In various embodiments, with TLS node-node communication, each client may establish its identity using a X509 certificate. Each connection between nodes may use two-way TLS, thereby allowing both peers to establish the identify of one another before communicating. In various embodiments, the system does this internally by maintaining a map of everyone's certificate to their user/computer ID pair at the nexus. Effectively, the nexus may act as a certificate authority (CA).

Specifically, the nexus may perform the following CA-like activities: accepting a generated public key from a node in the form of a CSR, returning a signed public key certificate with the nexus root CA, maintaining a list of revoked certificates, supporting an Online Certificate Status Protocol (OCSP) (or OCSP like) protocol to check validity of a certificate.

In a legacy system, a computer token may be generated (nexus side) for each new computer and associated with a computer/user ID pair. With the PKI feature, a public/private RSA key pair may generated (node side) and the public key is associated with a computer/user id pair.

In a legacy system, security may be session-based. For example, the computer token may be held secret between the node and the nexus, and a temporary handshake token may be generated to establish identity, which leads to a session token which exists for the duration of the logical connection. With the PKI feature, security may be certificate-based. For example, nodes may directly communicate with one another without ever needing to talk to the nexus (regarding identity) as they may verify the authenticity of the connecting node's identity by verifying the root of the presented certificate. Thus, the PKI feature, including its communication infrastructure, may result in significantly reduced load on the nexus and faster connections between nodes because, for example, the node identity may be verified without a round trip to the nexus (e.g., through caching the issuing certificate public key).

Installation

Upon installation the nodes may generate a public/private key pair. The nodes may generate RSA keys with 2048 or 4096 bit length. A key store on the node may be the sole location of the node's private key. A trust store on the node may contain the nexus public key. In this way, trust of certificates signed with the nexus public key may be enabled. In various embodiments, trust stores may be Java key stores (JKS). Alternatively, trust stores may be non-Java specific trust stores.

Another registerComputer call may perform a SCEP request (Simple Certificate Enrollment Request). A signed X509 certificate may be issued back to the node as per SCEP from the nexus. The nexus may record the issuer and serial number of the certificate and associate it with that computer/user ID.

The node may store this certificate for some time (e.g., one year by default). Thus, the installation of the PKI feature may be completed.

In various embodiments, third-party APIs (e.g., Legion of Bouncy Castle APIs) may be used to perform various operations.

Normal Operation:

Say Node A wants to perform a getFile on Node B.

Node A gets the IP and port of Node B as before.

Node A attempts to connect via TLS to Node B directly to the getFile endpoint.

Node B challenges Node A for its client certificate.

Node A provides the client certificate it got during install, signed by the nexus.

Node B performs an OCSP request to the nexus to verify the status of node A's certificate. Alternatively this can be done directly over the existing SSL connection with the nexus.

Nexus replies that Node A's certificate is "good."

Node B replies with its public certificate which is subsequently also verified by the nexus (e.g., by node A).

Node A accepts the cert, and the secure channel is created.

Node A gets the file from node B.

A few optimizations may be made:

Support resuming TLS sessions, so if a secure connection was still established but idle, it may be reused, allowing the last step of normal operation to be skipped.

OCSP supports a cache lifetime (like a TTL). This may be set to a default value that organizations may configure later.

In various embodiments, the only things tying the PKI feature to the nexus may be:

The location of the SCEP endpoint (i.e. registering a certificate with the CA);

The location of the OCSP endpoint (or similar) (i.e. verifying an issued certificate with the CA); and The public key that is preloaded into a trust store for the CA (i.e. which CAs does the system trust).

Implementing the PKI feature on the communication architecture allows the system to interoperate with existing PKI systems, essentially making the system completely blind to what is going on and stripping the system of the ability to modify any communication relationships. In various embodiments, multiple organizations, each with their own PKI, may interoperate with one another.

Transparent Relays:

With the standards-based communication structure, relayed connection may be more complex. Many SSL libraries may not support decoupling the socket and the SSL state machine, which may be necessary to inject unencrypted (or at least public to the relay) routing information on the message so the relay knows how to deliver a given message.

The solution may be twofold. Using STARTTLS, the system may create a plaintext handshake with the relay server, communicate the routing info, establish the connection to the relayed node, and then transition to an SSL connection before the first bit of cyphertext is ever sent to the relayed client.

In various embodiments, the relay servers will NOT be performing any part of the SSL handshake; they merely forward the packets to the intended host in a transparent manner. Therefore the relays have absolutely no visibility in the underlying data that is being transmitted.

Mobile:

In various embodiments, Android may leverage the same code as the normal (e.g., PC) clients and onsite. In various embodiments, iOS may need to do Simple Certificate Enrollment Protocol (SCEP) server-side generation and deliver the cert using a PIN.

Private-Private Cloud Communication:

One of the most powerful aspects of the system may be the ability for two or more organizations with separate IT infrastructure to collaborate easily.

In the normal certificate infrastructure case where the system is the central, common CA, this may be fairly straightforward. Each client's certificate may identify the common system CA as a trusted root authority, and therefore accept the remote peer's certificate. Effectively it may make no difference that the two nodes are in separate organizations since they trust the same root.

In various embodiments, when organizations use their own internal PKI, an assumption that each party's root is trusted by the opposite party will not be true. For example, a certificate signed by Company X may not be trusted by a client who only trusts Company Y's CA. Therefore, the system may need to modify the trust relationships to support trusting not just the system root CA, but other CAs or endpoint certificates. In effect, by managing who is trusted, companies may define specific whitelists or "rings of trust" enforced by the system.

In one example, Company X and Company Y may agree that they need to collaborate on data. Using the system, every client in their organization may load both companys' CAs into the client's trusted store, making the client trust certificates issued from either authority. Furthermore, a system application may enforce that clients in company X must be signed with company X's CA, and clients in company Y must be signed by company Y's CA. This is not how typical certificate identification (e.g., standards-based PKI) works. However, by using the common name or subject in the certificate, the system may verify not only the identity of an endpoint, but that the endpoint identity is established with a proper chain. For example, a client may have <client id>.<org id>.client.adeptcloud.com in their subject name, which must match the organization ID in the signing CA's certificate. In special circumstances, even a single client may be added to trust for establishing finer trust silos.

Synchronizing and maintaining the trust stores on the clients would be a nightmare in a typical piece of software. However, leveraging the system's cloud-managed paradigm, the system may use a central server to delegate which clients synchronize which CA's (or client certificates) into their trust stores. This information may come directly from the nexus, or for even more added security, may be delivered using the system onsite servers.

Another possible useful configuration may be allowing for organizations to provide intermediate certificates that will be delivered by the system. Clients may have special permission for these types of "chained" certificate configurations, for instance the ability to synchronize more sensitive data.

In various embodiments, a client-side implementation may include prototype certificate generation, prototype certificate chaining (e.g., signing by a third party), establishing base socket communication (e.g., using Netty with TLS 2.0 and custom certs), streaming interfaces (e.g., Interface standard Input/Ouput streams to Netty ByteStreams), refactoring node interfaces in preparation for secure messaging applications (e.g., AdeptSecureMessage), building request/response wrappers (e.g., on top of Netty), tying back Node External Services to new TLS backend, tying back Onsite External Services to new TLS backend, building a STARTTLS pipeline factory, updating relay server to relay STARTTLS, and modifying relay client to support STARTTLS.

In various embodiments, a server-side implementation may include adding a serial number entry to the computer field nexus side, implementing SCEP, implementing OCSP, and exposing some OCSP/SCEP configuration options to organizations.

Figure 20:
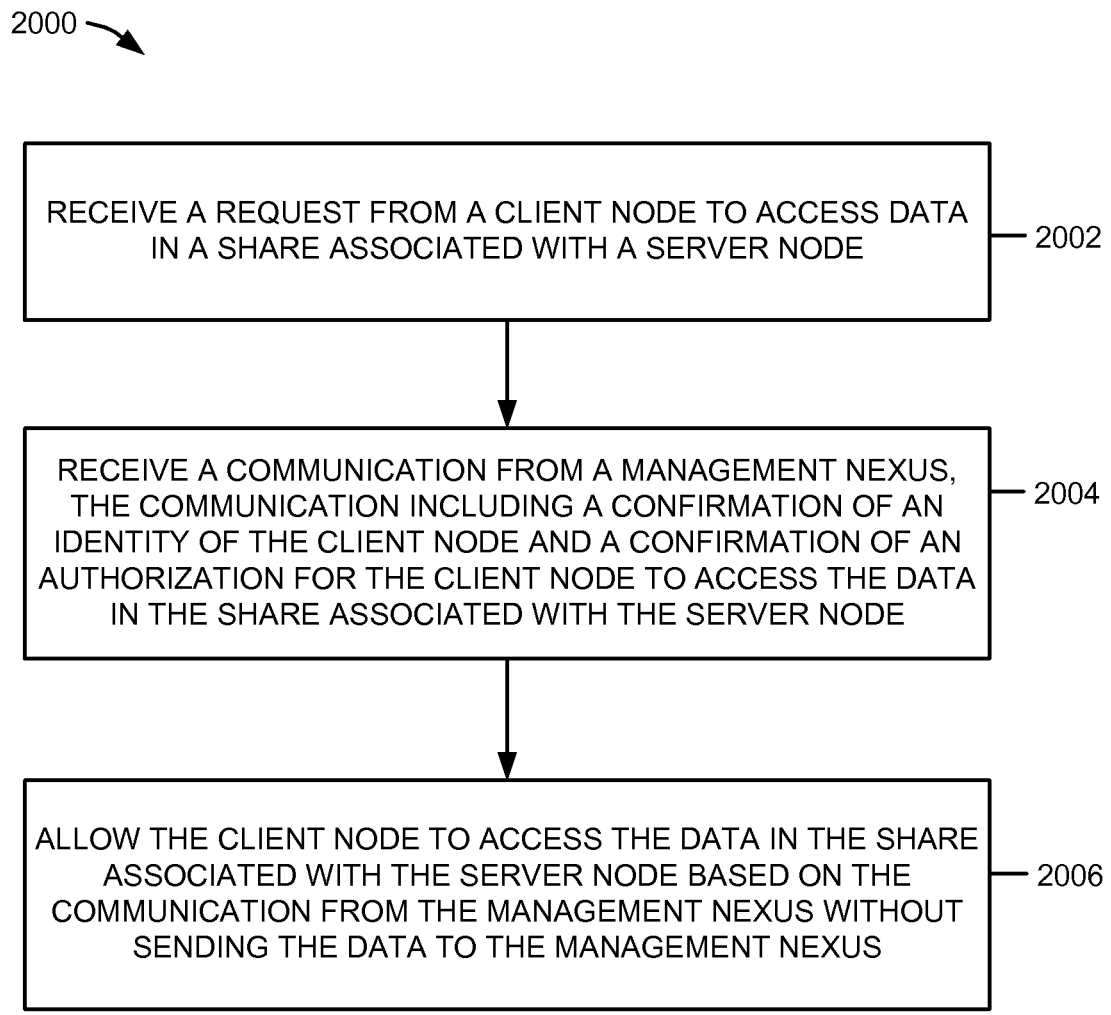
FIG. 20 is a flowchart illustrating an example method of sharing data.

FIG. 20 is a flowchart illustrating an example method 2000 of sharing data. At operation 2002, a request is received from a client node to access data in a share associated with as server node. For example, the request may be received at the server node or the request may be received at an Onsite service installed within a firewall.

At operation 2004, a communication is received from a management nexus (e.g., at the server node or the Onsite service). The communication confirms the identity of the client node and a confirmation of an authorization for the client node to access the data in the share associated with the server node. The communication may be sent in response to a request for the confirmation of the identity of the client node and a confirmation of the authorization for the client node to access the data in the share associated with the server node.

At operation 2006, the client node is allowed to access the data in the share associated with the server node based on the communication received from the management nexus. For example, the client node is allowed to establish a connection with the server node or the Onsite service via a relay endpoint, as described above. In various embodiments, the connection is established based on the security measures described above (e.g., in response to an exchange of certificates between the client node, the server node, and the management nexus). In various embodiments, the data in the share is not transferred to the management nexus. Instead, the data is transferred directly from the server node (or Onsite service) to the client node (e.g., via the relay) without involving the management nexus. Thus the nexus remains ignorant of the actual data that is transferred between nodes.

Modules, Components, and Logic

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the network 104 of FIG. 1) and via one or more appropriate interfaces (e.g., APIs).

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., a FPGA or an ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures should be considered. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Figure 21:
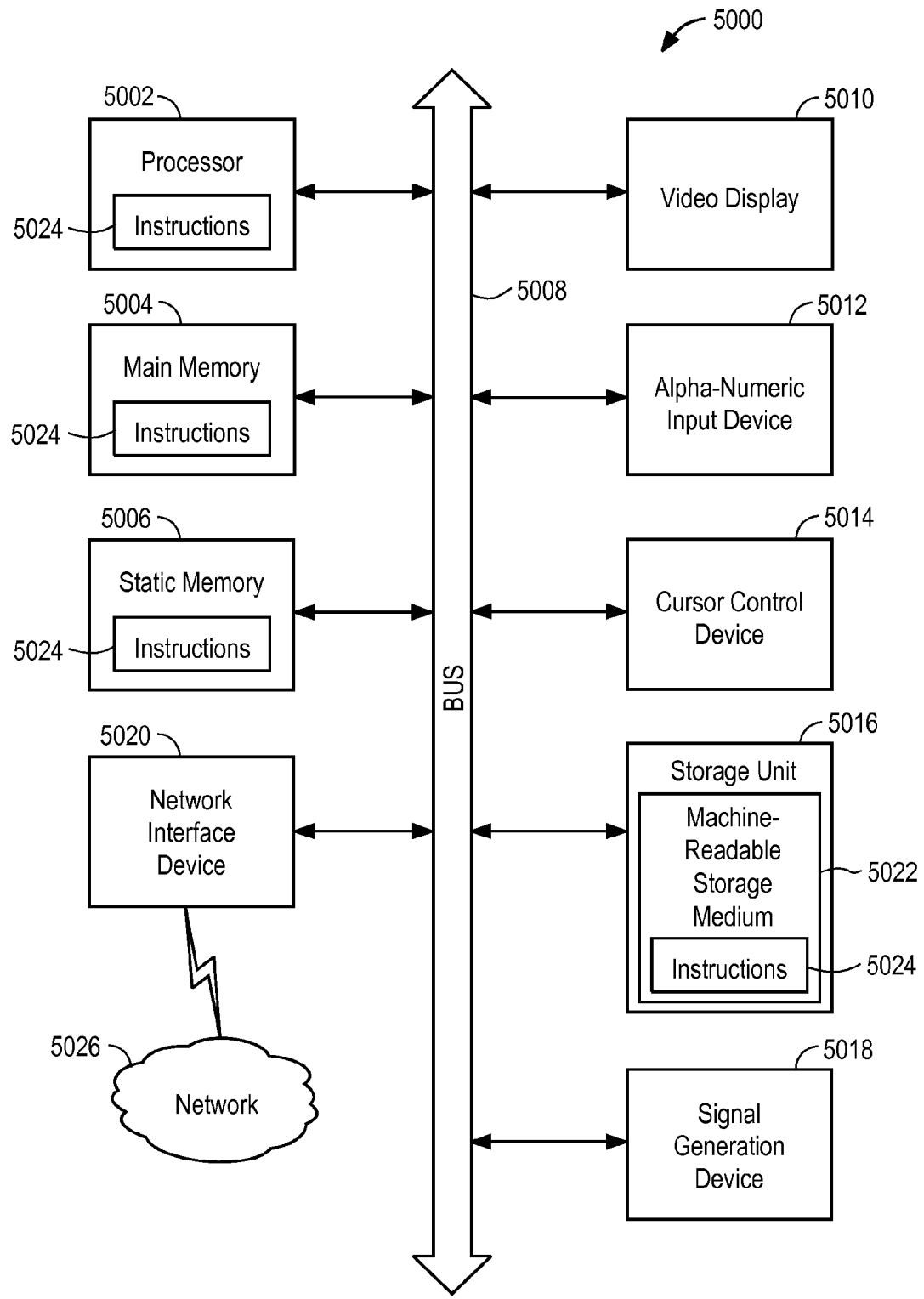
FIG. 21 is a block diagram of machine in the example form of a computer system within which instructions for causing the machine to perform operations corresponding to any one or more of the methodologies discussed herein may be executed.

FIG. 21 is a block diagram of machine in the example form of a computer system 5000 within which instructions 5024 for causing the machine to perform operations corresponding to one or more of the methodologies discussed herein may be executed. In alternative embodiments, the machine operates as a standalone device or may be connected (e.g., networked)

to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 5000 includes a processor 5002 (e.g., a central processing unit (CPU), a graphics processing unit (GPU) or both), a main memory 5004 and a static memory 5006, which communicate with each other via a bus 5008. The computer system 5000 may further include a video display unit 5010 (e.g., a liquid crystal display (LCD) or a cathode ray tube (CRT)). The computer system 5000 also includes an alphanumeric input device 5012 (e.g., a keyboard), a user interface (UI) navigation (or cursor control) device 5014 (e.g., a mouse), a storage unit 5016, a signal generation device 5018 (e.g., a speaker) and a network interface device 5020.

The storage unit 5016 includes a machine-readable medium 5022 on which is stored one or more sets of data structures and instructions 5024 (e.g., software) embodying or utilized by any one or more of the methodologies or functions described herein. The instructions 5024 may also reside, completely or at least partially, within the main memory 5004 and/or within the processor 5002 during execution thereof by the computer system 5000, the main memory 5004 and the processor 5002 also constituting machine-readable media. The instructions 5024 may also reside, completely or at least partially, within the static memory 5006.

While the machine-readable medium 5022 is shown in an example embodiment to be a single medium, the term "machine-readable medium" may include a single medium or multiple media (e.g., a centralized or distributed database, and/or associated caches and servers) that store the one or more instructions 5024 or data structures. The term "machine-readable medium" shall also be taken to include any tangible medium that is capable of storing, encoding or carrying instructions for execution by the machine and that cause the machine to perform any one or more of the methodologies of the present embodiments, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and compact disc-read-only memory (CD-ROM) and digital versatile disc (or digital video disc) read-only memory (DVD-ROM) disks.

The instructions 5024 may further be transmitted or received over a communications network 5026 using a transmission medium. The instructions 5024 may be transmitted using the network interface device 5020 and any one of a number of well-known transfer protocols (e.g., HTTP). Examples of communication networks include a LAN, a WAN, the Internet, mobile telephone networks, POTS networks, and wireless data networks (e.g., WiFi and WiMax networks). The term "transmission medium" shall be taken to include any intangible medium capable of storing, encoding or carrying instructions for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the present disclosure. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to allow those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A system comprising:
 a processor-implemented, cloud-based server node configured to:
 receive a request from a processor-implemented client node external to a local network of the server node to access data in a share associated with the server node, the share comprising one or more data files;
 receive a communication from a processor-implemented management nexus, the communication including a confirmation of an identity of the client node and a confirmation of an authorization for the client node to access the data in the share associated with the server node, the communication further including an identifier of a relay session established between a relay server and the client node by the management nexus, wherein the management nexus maintains a shares database identifying a plurality of available shares and an access control list associated with the available shares for each relay session, and wherein the management nexus maintains key management between the cloud-based server node and the client node; and
 responsive to receiving the communication from the management nexus, send the client node the data in the share associated with the server node via the identified relay session without sending the data to the management nexus.

2. The system of claim 1, wherein the processor-implemented server node is further configured to:
receive a client certificate from the client node; and
send a request to the management nexus to verify a status of the client certificate;
wherein the confirmation of the authorization for the client node to access the data in the share associated with the server node is based on the verification of the status of the client certificate by the management nexus; and
wherein sending the data in the share associated with the server node to the client node includes establishing a secure communication channel with the identified relay server responsive to the verification of the status of the certificate by the management nexus.

3. A computer-implemented method comprising:
receiving at a cloud-based server node, a request from a client node external to a local network of the server node to access data in a share associated with the server node, the share comprising one or more data files;
receiving a communication from a management nexus, the communication including a confirmation of an identity of the client node and a confirmation of an authorization for the client node to access the data in the share associated with the server node, the communication further including an identifier of a relay session established between a relay server and the client node by the management nexus, wherein the management nexus maintains a shares database identifying a plurality of available shares and an access control list associated with the available shares for each relay session, and wherein the management nexus maintains key management between the cloud-based server node and the client node; and
transmitting the data in the share associated with the server node from the server node to the client node via the identified relay session without sending the data to the management nexus.

4. The method of claim 3, further comprising:
receiving a client certificate from the client node; and
sending a request to the management nexus to verify a status of the client certificate;
wherein the confirmation of the authorization for the client node to access the data in the share associated with the server node is based on the verification of the status of the client certificate by the management nexus; and
wherein transmitting the data in the share associated with the server node includes establishing a secure communication channel between the server node and the identified relay server responsive to the verification of the status of the client certificate by the management nexus.

5. The system of claim 1, wherein the processor-implemented server node is further configured to:
receiving from the management nexus, an identifier of another processor-implemented server node storing an alternative version of the share;
establishing communication with the other server node; and
updating the share stored by the server node with the alternative version of the share stored by the other server node via the established communication.

6. The system of claim 1, wherein the processor-implemented server node is further configured to:
receive a client certificate from the client node; and
responsive to receiving the client certificate, send a server certificate to the client node, wherein the client node is configured to send the server certificate to the management nexus to verify a status of the server certificate and access the data in the share associated with the server node responsive to the verification of the server certificate.

7. The method of claim 3, further comprising:
receiving from the management nexus, an identifier of another processor-implemented server node storing an alternative version of the share;
establishing communication with the other server node; and
updating the share stored by the server node with the alternative version of the share stored by the other server node via the established communication.

8. The method of claim 3, further comprising:
receiving a client certificate from the client node; and
responsive to receiving the client certificate, sending a server certificate to the client node, wherein the client node is configured to send the server certificate to the management nexus to verify a status of the server certificate and access the data in the share associated with the server node responsive to the verification of the server certificate.

9. A computer-implemented method comprising:
storing in a management nexus, a plurality of identifiers of shares each stored on one or more server nodes, each share comprising one or more data files;
receiving a request from a client node to access data in a share;
identifying the server node storing the requested share based on the stored identifiers;
responsive to determining the server node storing the requested share is unreachable, identifying a server node storing a copy of the requested share; and
establishing by the management nexus, a communication session between a relay server and the server node storing the copy of the requested share, the client node configured to access the data in the requested share via the communication session between the relay server and the server node storing the copy of the requested share without sending the data to the management nexus.

10. The method of claim 9, wherein establishing the communication session between the relay server and the server node storing the copy of the requested share comprises:
determining the server node storing the copy of the requested share is behind a firewall; and
establishing the communication session between the relay server and the server node storing the copy of the requested share dynamically in response to determining the server node storing the copy of the requested share is behind the firewall.

11. The method of claim 9, wherein establishing the communication session between the relay server and the server node storing the copy of the requested share comprises:
verifying by the management nexus, a client certificate associated with the client node; and
authorizing the client node to access the data in the share responsive to the verification of the client certificate, the communication session established responsive to the authorization.

12. The method of claim 9, wherein each of the identifiers of shares comprises an access control list specifying user permissions for the respective share, and wherein establishing the communication session between the relay server and the server node storing the copy of the requested share comprises authorizing a user of the client node to access the data in the requested share based on the access control list of the requested share.

13. The method of claim 9, wherein each of the identifiers of shares comprises a version number of the respective share at each of the one or more server nodes storing the respective share, and wherein identifying the server node storing the copy of the requested share comprises identifying the server node storing a current version of the requested share based on the stored version numbers.

14. The method of claim 9, wherein each of the identifiers of shares comprises a version number of the respective share at each of the one or more server nodes storing the respective share, the method further comprising:
- receiving from a first server node storing the respective share, a request to synchronize the respective share with other server nodes storing the respective share;
- identifying a second server node storing a current version of the respective share; and
- establishing a communication session between the first server node and the second server node, the first server node configured to update the share stored by the first server node with the current version of the share stored by the second server node via the established communication session.

* * * * *